(12) United States Patent
Fujikawa

(10) Patent No.: US 11,170,676 B2
(45) Date of Patent: *Nov. 9, 2021

(54) ELECTRO-OPTICAL DEVICE AND ELECTRONIC APPARATUS

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/034,619

(22) Filed: Sep. 28, 2020

(65) Prior Publication Data

US 2021/0027681 A1 Jan. 28, 2021

Related U.S. Application Data

(63) Continuation of application No. 16/527,757, filed on Jul. 31, 2019, now Pat. No. 10,825,369.

(30) Foreign Application Priority Data

Aug. 1, 2018 (JP) .............................. JP2018-144873

(51) Int. Cl.
*G06F 3/038* (2013.01)
*G09G 5/00* (2006.01)
(Continued)

(52) U.S. Cl.
CPC ........... *G09G 3/006* (2013.01); *G09G 3/3648* (2013.01); *G02F 1/1368* (2013.01);
(Continued)

(58) Field of Classification Search
CPC ............ G02F 1/136286; G02F 1/1368; G09G 2310/0248; G09G 2310/08;
(Continued)

(56) References Cited

U.S. PATENT DOCUMENTS 5,959,600 A 9/1999 Uchino et al.
6,266,039 B1 7/2001 Aoki
(Continued)

FOREIGN PATENT DOCUMENTS

JP H08-286639 A 11/1996
JP H11-271806 A 10/1999
(Continued)

*Primary Examiner* — Insa Sadio
(74) *Attorney, Agent, or Firm* — Oliff PLC

(57) ABSTRACT

An electro-optical device includes a pre-charge circuit configured to supply a pre-charge signal to a first and second signal line at different timings based on a pre-charge control signal, and an inspection circuit configured to output, to the pre-charge circuit, an inspection control signal indicating whether a target is to be inspected in an inspection operation. The pre-charge circuit includes a first switch, an electrical coupling state between the first signal line and a pre-charge power supply line based on a first coupling control signal, a second switch, an electrical coupling state between the second signal line and the pre-charge power supply line based on a second coupling control signal, a first signal to output the first coupling control signal to the first switch, and a second signal to output the second coupling control signal to the second switch based on the inspection control signal and the pre-charge control signal.

6 Claims, 20 Drawing Sheets

(51) Int. Cl.
  *G09G 3/00*   (2006.01)
  *G09G 3/36*   (2006.01)
  *G02F 1/1362* (2006.01)
  *G02F 1/1368* (2006.01)
(52) U.S. Cl.
  CPC ............... *G02F 1/136286* (2013.01); *G09G 2310/0248* (2013.01); *G09G 2330/12* (2013.01)
(58) Field of Classification Search
  CPC .. G09G 2330/12; G09G 3/006; G09G 3/3648; G09G 3/3688
  See application file for complete search history.

(56) References Cited

U.S. PATENT DOCUMENTS

| | | | |
|---|---|---|---|
| 2006/0221701 A1* | 10/2006 | Sun | G09G 3/3648 365/185.22 |
| 2010/0045638 A1* | 2/2010 | Cho | G09G 3/3688 345/204 |
| 2015/0154926 A1 | 6/2015 | Fujikawa | |

FOREIGN PATENT DOCUMENTS

| | | |
|---|---|---|
| JP | 3648976 B2 | 5/2005 |
| JP | 2005-208611 A | 8/2005 |
| JP | 3704716 B2 | 10/2005 |
| JP | 2015-106108 A | 6/2015 |
| WO | 99/004384 A1 | 1/1999 |

\* cited by examiner

ELECTRO-OPTICAL DEVICE AND ELECTRONIC APPARATUS

CROSS REFERENCE

This application is a continuation of U.S. application Ser. No. 16/527,757, filed Jul. 31, 2019, the contents of which are incorporated herein by reference. The present application is based on, and claims priority from JP Application Serial Number 2018-144873, filed Aug. 1, 2018, the disclosure of which is hereby incorporated by reference herein in its entirety.

BACKGROUND

1. Technical Field

The present disclosure relates to an electro-optical device and an electronic apparatus.

2. Related Art

An electro-optical device that displays an image using a liquid crystal element supplies a video voltage based on an image signal specifying a gradation of each pixel to each pixel via a signal line, to control such that transmittance of the liquid crystal contained in each pixel is set to a transmittance based on the video voltage. As a result, the gradation of each pixel is set to the gradation specified by the image signal.

When writing of the video voltage to each pixel is insufficient, such as in a case that time for supplying the video voltage to each pixel cannot be sufficiently ensured, each pixel may not be able to accurately display the gradation specified by the image signal. Thus, in a typical electro-optical device, for example, by performing pre-charge for charging a signal line to a predetermined voltage level, insufficient writing of the video voltage for each pixel is prevented. For example, re-publication of PCT International Publication No. 99-004384 discloses a liquid crystal apparatus that performs, in a time-division manner, pre-charge for all signal lines and writing of a video voltage to pixels in one horizontal scanning period. Additionally, JP-A-2015-106108 discloses an electro-optical device that simultaneously performs pre-charge for some of a plurality of signal lines and writing of a video voltage to pixels in one horizontal scanning period.

Additionally, JP-A-11-271806 discloses a configuration in which, in a liquid crystal apparatus that performs simultaneous pre-charge for all signal lines, an inspection circuit for inspecting a state of the signal line is used as a pre-charge circuit.

However, the inspection circuit including an addressing function for specifying a signal line to be inspected is independently provided without being used as the pre-charge circuit. In this case, a switch for supplying an image signal to the signal line, a switch for inspection, a switch for pre-charge, and the like are coupled to the signal line. When the number of switches coupled to the signal line increases, it becomes difficult to narrow disposal pitches of the switch for inspection, the switch for pre-charge, the signal line, and the like.

SUMMARY

In order to solve the above-described problem, an aspect of an electro-optical device according to the present disclosure is an electro-optical device configured to supply an image signal to a first signal line and a second signal line, that includes a pre-charge circuit that, when a direction in which the first signal line extends from an input end of the image signal on the first signal line is taken as a first direction, is disposed on the first direction side of a display region that displays an image, and that is configured to supply a pre-charge signal to the first signal line and the second signal line at different timings based on a pre-charge control signal, and an inspection circuit that is disposed on the first direction side of the display region, and that is configured to output, in an inspection operation for inspecting the first signal line and the second signal line, an inspection control signal to the pre-charge circuit indicating whether the first signal line and the second signal line are to be inspected, in which the pre-charge circuit includes a first switch configured to switch, between a conductive state and a non-conductive state, an electrical coupling state between the first signal line and a pre-charge power supply line to which the pre-charge signal is supplied, based on a first coupling control signal, a second switch configured to switch, between a conductive state and a non-conductive state, an electrical coupling state between the second signal line and the pre-charge power supply line to which the pre-charge signal is supplied, based on a second coupling control signal, a first signal selection circuit configured to output the first coupling control signal to the first switch based on the inspection control signal and the pre-charge control signal, and a second signal selection circuit configured to output the second coupling control signal to the second switch based on the inspection control signal and the pre-charge control signal.

DESCRIPTION OF EXEMPLARY EMBODIMENTS

First Exemplary Embodiment

Figure 1:
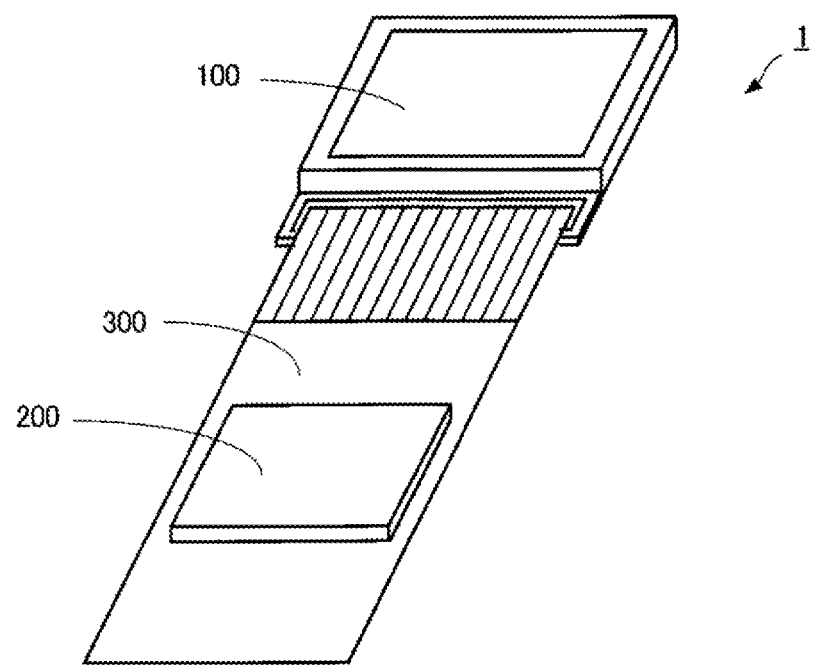
FIG. 1 is an explanatory diagram of an electro-optical device according to First Exemplary Embodiment of the present disclosure.

First Exemplary Embodiment of the present disclosure will be described below with reference to FIGS. 1 to 8. FIG. 1 is an explanatory diagram of an electro-optical device 1 according to First Exemplary Embodiment of the present disclosure. Note that FIG. 1 illustrates a configuration of a signal transmission system for the electro-optical device 1. The electro-optical device 1 includes an electro-optical panel 100, a drive integrated circuit 200 such as a driver IC (Integrated Circuit), and a flexible circuit board 300. The electro-optical panel 100 is coupled to the flexible circuit board 300 on which the drive integrated circuit 200 is mounted. Further, the electro-optical panel 100 is coupled to a host CPU (Central Processing Unit) device (not illustrated) via the flexible circuit board 300 and the drive integrated circuit 200. The drive integrated circuit 200 is a device that receives an image signal and various control signals for drive control from the host CPU device via the flexible circuit board 300, and drives the electro-optical panel 100 via the flexible circuit board 300.

Figure 2:
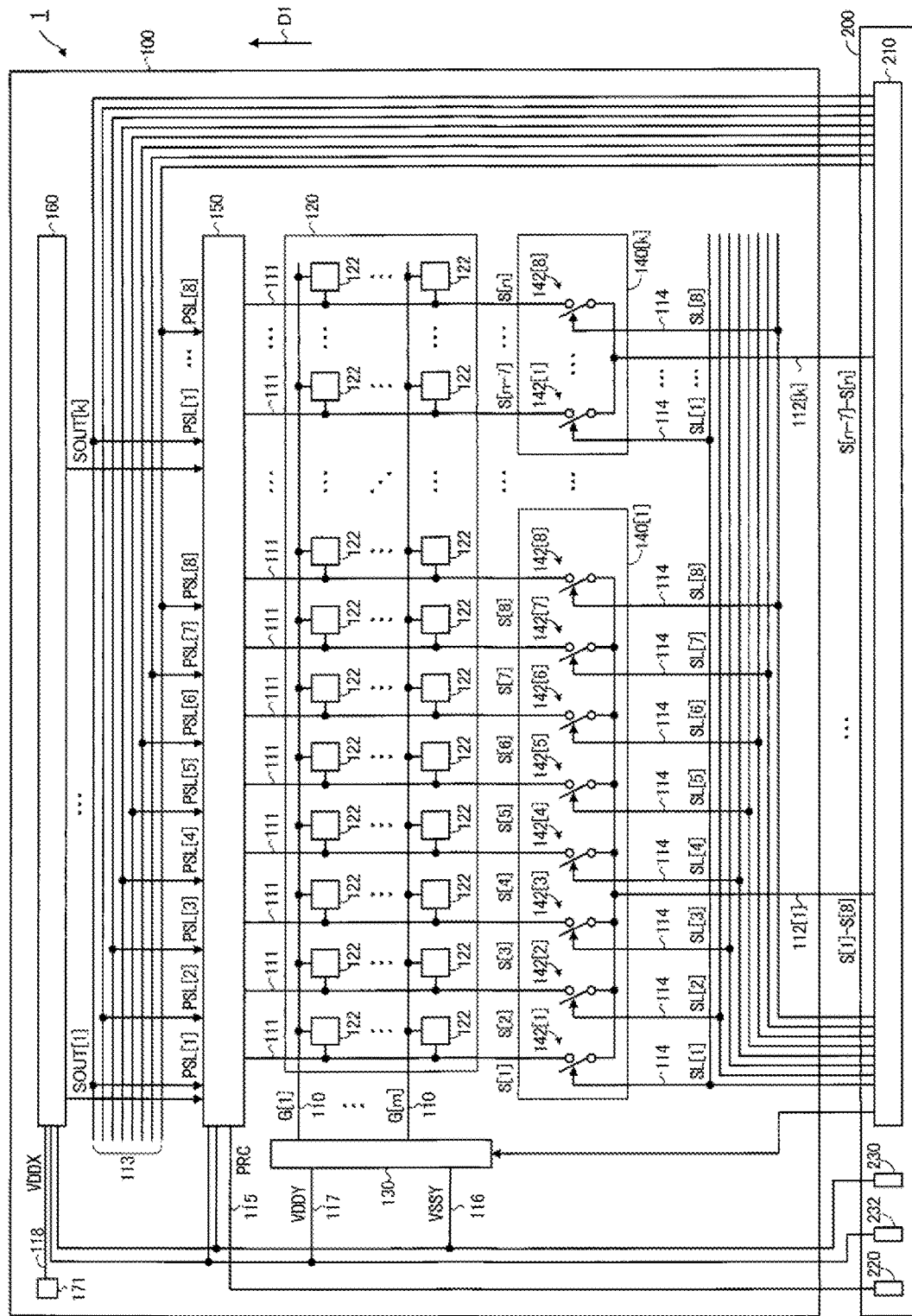
FIG. 2 is a block diagram illustrating a configuration of the electro-optical device according to First Exemplary Embodiment.

FIG. 2 is a block diagram illustrating a configuration of the electro-optical device 1 according to First Exemplary Embodiment. A first direction D1 in FIG. 2 denotes, in the electro-optical panel 100, with an input end of an image signal S on a single signal line 111 among a plurality of the signal lines 111 being a starting point, an extending direction of the single signal line 111. Note that, in FIG. 2, a description of inspection pads other than a first inspection pad 171 is omitted for ease of illustration. For example, a description of an inspection pad of a data line 112, an inspection pad of a write selection signal line 114, an inspection pad of a pre-charge control signal line 113, a second inspection pad 172 illustrated in FIG. 4, and the like is omitted.

The electro-optical panel 100 of the electro-optical device 1 includes m scanning lines 110, n signal lines 111, the pre-charge control signal line 113, a pre-charge power supply line 115, a display region 120, a scanning line drive circuit 130, k demultiplexers 140[1] to 140[k], a pre-charge circuit 150, and an inspection circuit 160. Note that m, n, and k are natural numbers. In an example illustrated in FIG. 2, since the n signal lines 111 are classified into k signal line groups each of which includes eight signal lines 111, k is a value obtained by dividing n by 8. The drive integrated circuit 200 of the electro-optical device 1 includes a signal line driving circuit 210 that supplies the image signal S to the signal line 111, a pre-charge power supply 220, a first power supply 230, and a second power supply 232. Note that the drive integrated circuit 200 may have a form in which the power supplies, that is, the pre-charge power supply 220, the first power supply 230, and the second power supply 232, and the signal line driving circuit 210 are separated.

Figure 3:
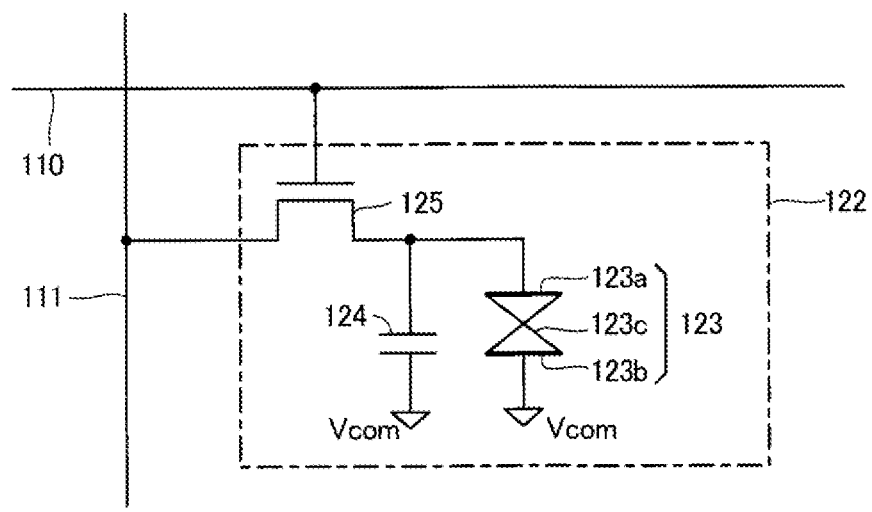
FIG. 3 is a circuit diagram illustrating a configuration of a pixel.

The display region 120 is a region that displays an image. For example, the display region 120 includes a pixel 122 that is provided corresponding to each intersections of them scanning lines 110 and then signal lines 111. As illustrated in FIG. 3, the pixel 122 includes a liquid crystal 123c whose transmittance changes depending on an applied voltage. Since the transmittance of the liquid crystal 123c changes depending on the voltage applied to the liquid crystal 123c, a display gradation of the pixel 122 changes. In FIG. 2, a row of the pixels 122 illustrated on a topmost side of the figure is a first row, and a column of the pixels 122 illustrated on a leftmost side of the figure is a first column.

The scanning line drive circuit 130 generates scanning signals G[1] to G[m] based on a control signal received from the drive integrated circuit 200, and outputs the scanning signals G[1] to G[m] to the respective m scanning lines 110. For example, the scanning line drive circuit 130 sequentially activates the scanning signals G[1] to G[m] for the respective scanning lines 110 in a vertical scanning period for each horizontal scanning period.

Note that the scanning line drive circuit 130 operates, with a first power supply voltage VSSY supplied from the first power supply 230 via a low potential side power supply line 116, and a second power supply voltage VDDY supplied from the second power supply 232 via a high potential side power supply line 117 being power supply voltages. The second power supply voltage VDDY is higher than the first power supply voltage VSSY. For example, a scanning signal G is activated for a period of time in which the scanning signal G is maintained at a selected voltage, such as a high level generated based on the second power source 232, and is deactivated for a period of time in which the scanning signal G is maintained at a non-selected voltage, such as a low level generated based on the first power supply 230. In other words, the second power supply 232 applies a potential to the scanning line 110 in a selected state, and the first power supply 230 applies a potential to the scanning line 110 in a non-selected state.

For example, for a period in which a scanning signal G[p] corresponding to a p-th row is maintained at the selected voltage, the scanning line 110 corresponding to the p-th row is in the selected state, and each of the liquid crystals 123c included in the respective n pixels 122 in the p-th row is electrically coupled to the respective n signal lines 111. Note that p is a natural number from 1 to m. Further, for a period in which the scanning signal G[p] is maintained at the non-selected voltage, the scanning line 110 corresponding to the p-th row is in the non-selected state, and an electrical coupling state between each of the liquid crystals 123c included in the respective n pixels 122 in the p-th row and each of the n signal lines 111 is a non-conductive state.

The k demultiplexers 140[1] to 140[k] correspond to the respective k signal line groups. For example, each of the k demultiplexers 140[1] to 140[*k*] receives the image signal S that is supplied from the signal line driving circuit 210 to each of the k data lines 112[1] to 112[*k*]. Note that, in the present exemplary embodiment, the signal lines 111 are divided into units of eight lines, so the image signal S for eight pixels is supplied to the one data line 112 in a time-division manner from the signal line driving circuit 210. Accordingly, each of the demultiplexers 140 supplies the image signal S to the eight signal lines 111 included in a corresponding signal line group in a time-division manner.

Each of the demultiplexers 140 has eight writing switches 142[1] to 142[8] coupled to the respective eight signal lines 111 included in the corresponding signal line group. In other words, when i is a natural number from 1 to k, one contact of each of the eight writing switches 142[1] to 142[8] of a demultiplexer 140[*i*] is coupled to each of the eight signal lines 111 that are in an 8×i−7-th column to an 8×i-th column. Further, the other contact of each of the eight writing switches 142[1] to 142[8] of the demultiplexer 140[*i*], that is, the contact that is not coupled to the signal line 111, is commonly coupled to the data line 112[*i*]. The k data lines 112[1] to 112[*k*] are coupled to the signal line driving circuit 210 of the drive integrated circuit 200 via the flexible circuit board 300.

The writing switches 142[1] to 142[8] are, for example, N-channel type transistors constituted by TFTs (thin film transistor) or the like, and are set to either the conductive state or the non-conductive state depending on the levels of the write selection signals SL[1] to SL[8] received by control terminals such as a gate. Note that the writing switches 142[1] to 142[8] may be switching elements other than TFTs. In the following, a writing switch 142[*j*] controlled by a write selection signal SL[j] is also referred to as a writing switch 142 in a j-th sequence. Note that j is a natural number from 1 to 8. Further, the signal line 111 coupled to the writing switch 142[*j*] in the j-th sequence is also referred to as the signal line 111 in the j-th sequence. Accordingly, a number or the like in square brackets of a reference sign of the write selection signal SL corresponds to a sequence number of the signal line 111 to be controlled. Similarly, a number or the like in square brackets of a pre-charge control signal PSL, which will be described later, corresponds to a sequence number of the signal line 111 to be controlled. One of the signal lines 111 in one sequence of two mutually different sequences is an example of the first signal line, and one of the signal lines in the other sequence is an example of the second signal line.

The eight writing switches 142[1] to 142[8] of each of the demultiplexers 140 respectively receive the write selection signals SL[1] to SL[8] from the signal line driving circuit 210 of the drive integrated circuit 200 via the respective write selection signal lines 114. The write selection signal line 114 is coupled to the signal line driving circuit 210 of the drive integrated circuit 200 via the flexible circuit board 300. The write selection signals SL[1] to SL[8] specify a start timing for outputting the image signal S to the respective signal lines 111.

For example, when one write selection signal SL[1] is at the high level and the other seven write selection signals SL[2] to SL[8] are at the low level, only the k writing switches 142[1] included in the respective k demultiplexers 140[1] to 140[*k*] are brought into the conductive state. Accordingly, each of the k demultiplexers 140[1] to 140[*k*] outputs the image signal S supplied to each of the k data lines 112, to the signal line 111 in the first sequence of each of the signal line groups. Hereinafter, similarly, each of the k demultiplexers 140[1] to 140[*k*] outputs the image signal S supplied to each of the k data lines 112, to the respective signal lines 111 in a second sequence, a third sequence, a fourth sequence, a fifth sequence, a sixth sequence, a seventh sequence, and an eighth sequence in each of the signal line groups.

The pre-charge circuit 150 is disposed on a side in the first direction D1 with respect to the display region 120 that displays an image. In other words, the pre-charge circuit 150 is disposed on an opposite side of the k demultiplexers 140[1] to 140[*k*] with respect to the display region 120. The pre-charge circuit 150 supplies a pre-charge signal PRC to the n signal lines 111 in a predetermined order based on the pre-charge control signals PSL[1] to PSL[8]. For example, the pre-charge circuit 150 supplies the pre-charge signal PRC at different timings to the first signal line that is one of the signal lines 111 in one sequence of two sequences of the signal lines 111 different from each other, and to the second signal line that is one of the signal lines 111 in the other sequence, based on the pre-charge control signal PSL.

The pre-charge control signals PSL[1] to PSL[8] are supplied to the pre-charge circuit 150 from the signal line driving circuit 210 via the respective pre-charge control signal lines 113. Note that, in the present exemplary embodiment, the signal lines 111 are divided into the eight sequences, so the number of the pre-charge control signal lines 113 is eight. The pre-charge control signal line 113 is an example of the first pre-charge control signal line and the second pre-charge control signal line. The pre-charge signal PRC is supplied from the pre-charge power supply 220 to the pre-charge circuit 150 via the pre-charge power supply line 115.

Note that the pre-charge circuit 150 operates, with the first power supply voltage VSSY supplied from the first power supply 230 via the low potential side power supply line 116, and the second power supply voltage VDDY supplied from the second power supply 232 via the high potential side power supply line 117 being power supply voltages. Details of the pre-charge circuit 150 will be described using FIG. 4.

The inspection circuit 160 is disposed on the side in the first direction D1 with respect to the display region 120 and the pre-charge circuit 150. The inspection circuit 160, in an inspection operation for inspecting the n signal lines 111, outputs inspection control signals SOUT[1] to SOUT[k] for selecting the signal line 111 to be inspected among the n signal lines 111 to the pre-charge circuit 150. Note that, in the inspection operation, the inspection circuit 160 is supplied with a third power supply voltage VDDX, which is higher than the first power supply voltage VSSY, from the first inspection pad 171 via the inspection power supply line 118. Details of the inspection circuit 160 will be described using FIG. 4.

The drive integrated circuit 200 synchronizes and controls the signal line driving circuit 210, the scanning line drive circuit 130, and the pre-charge circuit 150. The signal line driving circuit 210 outputs the image signals S for eight pixels as a time-series serial signals to each demultiplexer 140. For example, the signal line driving circuit 210 sequentially outputs image signals S[1] to S[8] to the demultiplexer 140[1], and sequentially outputs image signals S[n−7] to S[n] to the demultiplexer 140[*k*]. The image signal S supplied to an identical sequence of signal lines 111 is outputted from the signal line driving circuit 210 in parallel to each demultiplexer 140. In other words, the signal line driving circuit 210 outputs each image signal S supplied to an identical sequence of the signal lines 111 in parallel to each of the plurality of signal line groups.

The pre-charge power supply 220 applies a potential to the pre-charge power supply line 115. As a result, the pre-charge signal PRC is supplied to the pre-charge power supply line 115, for example. The first power supply 230 applies a potential to the low potential side power supply line 116. As a result, the first power supply voltage VSSY is supplied to the low potential side power supply line 116. The second power supply 232 applies a potential higher than the potential applied to the low potential side power supply line 116 to the high potential side power supply line 117. As a result, the second power supply voltage VDDY that is higher than the first power supply voltage VSSY is supplied to the high potential side power supply line 117. Next, a configuration of the pixel 122 will be described using FIG. 3.

FIG. 3 is a circuit diagram illustrating the configuration of the pixel 122. Each pixel 122 includes a liquid crystal element 123, a retention capacitor 124, and a pixel transistor 125. The liquid crystal element 123 is an electro-optical element including a pixel electrode 123a and a common electrode 123b that face each other, and the liquid crystal 123c disposed between the pixel electrode 123a and the common electrode 123b. A display gradation changes due to a change in transmittance of the liquid crystal 123c in accordance with an applied voltage between the pixel electrode 123a and the common electrode 123b. Note that a common voltage Vcom that is a constant voltage is supplied to the common electrode 123b via a common line (not illustrated).

The retention capacitor 124 is provided in parallel with the liquid crystal element 123. One terminal of the retention capacitor 124 is coupled to the pixel transistor 125, and the other terminal is connected to the common electrode 123b via a capacitor line (not illustrated).

The pixel transistor 125 is, for example, an N-channel type transistor constituted by a TFT or the like, and is provided between the liquid crystal element 123 and the signal line 111. Then, the pixel transistor 125 is set to either the conductive state or the non-conductive state in accordance with a level of the scanning signal G supplied to the scanning line 110 coupled to a gate. In other words, the pixel transistor 125 controls an electrical coupling between the liquid crystal element 123 and the signal line 111. For example, setting the scanning signal G[p] to the selected voltage allows the pixel transistor 125 in each pixel 122 in the p-th row to transit to the conductive state simultaneously or substantially simultaneously.

When the pixel transistor 125 is controlled to be set to the conductive state, the image signal S supplied from the signal line 111 is applied to the liquid crystal element 123. The liquid crystal 123c is set to a transmittance based on the image signal S by being applied with the image signal S. As a result, a gradation of each pixel 122 is set to a gradation specified by the image signal S. For example, when a light source (not illustrated) is turned on, light emitted from the light source passes through the liquid crystal 123c of the liquid crystal element 123 included in the pixel 122 and is outputted to an outside of the electro-optical device 1. In other words, when the image signal S is applied to the liquid crystal element 123, and the light source is turned on, the pixel 122 displays the gradation based on the image signal S.

In addition, the retention capacitor 124 provided in parallel with the liquid crystal element 123 is charged to a voltage applied to the liquid crystal element 123. In other words, each pixel 122 retains a potential corresponding to the image signal S in the retention capacitor 124.

Note that, in the electro-optical device 1, in order to prevent electrical deterioration of an electro-optical material, polarity inversion driving is employed in which a polarity of the voltage applied to the liquid crystal element 123 is inverted every constant period. For example, the electro-optical device 1 inverts a level of the image signal S to be supplied to the pixel 122 via the signal line 111 every one vertical scanning period with respect to a center voltage of the image signal S. Note that the period for inverting the polarity can be arbitrarily set, and for example, may be set to a natural number multiple of the vertical scanning period. In the present specification, a polarity in which a voltage of the image signal S is high with respect to a predetermined voltage such as the center voltage is referred to as a positive polarity, and a polarity in which the voltage of the image signal S is low with respect to the predetermined voltage is referred to as a negative polarity. Next, a configuration of the pre-charge circuit 150 and the inspection circuit 160 will be described with reference to FIG. 4.

Figure 4:
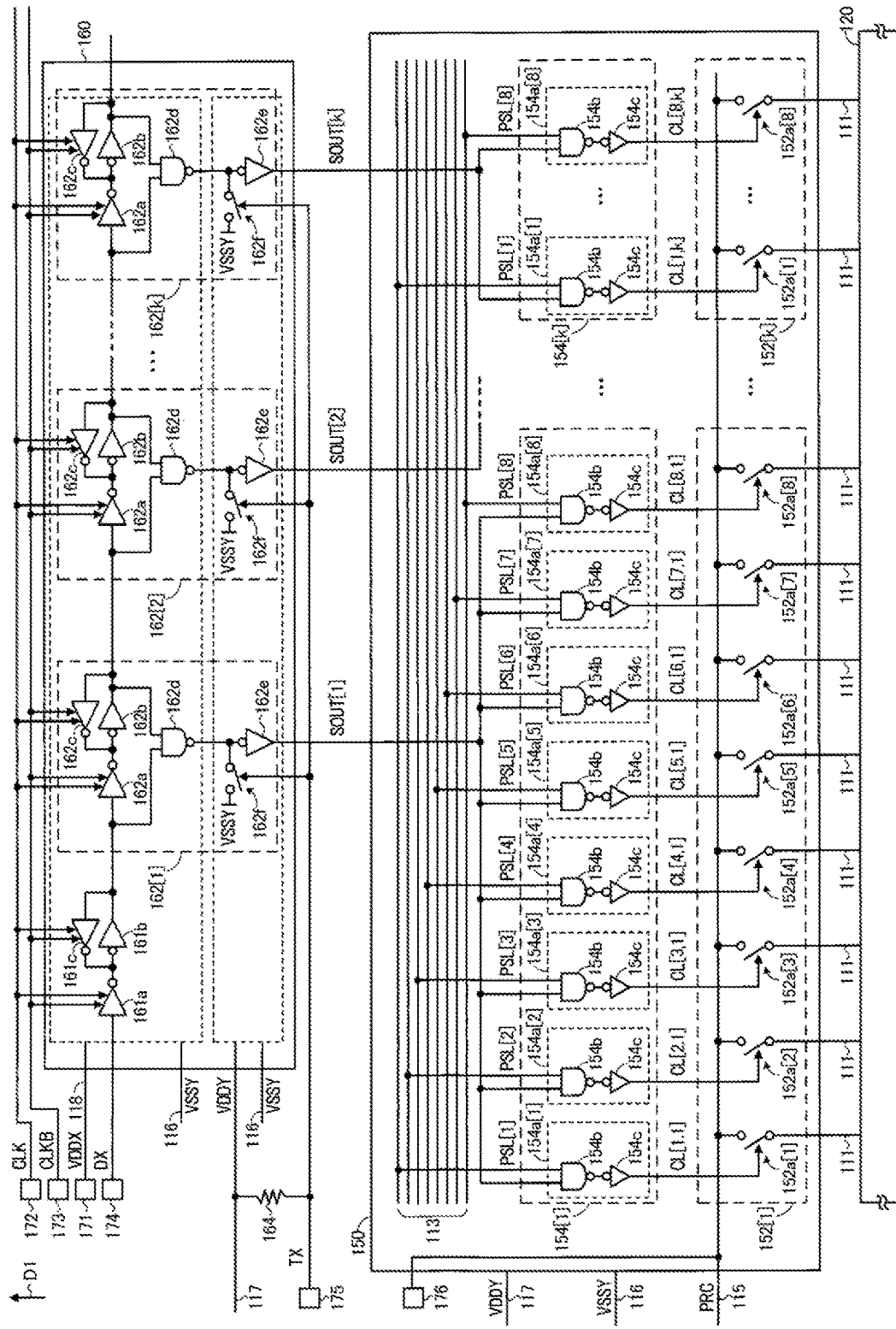
FIG. 4 is a circuit diagram illustrating a configuration of a pre-charge circuit and an inspection circuit in FIG. 2.

FIG. 4 is a circuit diagram illustrating the configuration of the pre-charge circuit 150 and the inspection circuit 160 in FIG. 2. The meaning of the first direction D1 in FIG. 4 is identical to that of the first direction D1 in FIG. 2. The first inspection pad 171 to a sixth inspection pad 176 illustrated in FIG. 4 are used in an inspection process or the like. For example, the third power supply voltage VDDX that is higher than the first power supply voltage VSSY is supplied to the first inspection pad 171. A first clock signal CLK is supplied to the second inspection pad 172, and a second clock signal CLKB that is an inverted signal of the first clock signal CLK is supplied to a third inspection pad 173. In addition, a start pulse DX is supplied to a fourth inspection pad 174, and an inspection mode signal TX is supplied to a fifth inspection pad 175. Further, the sixth inspection pad 176 is coupled to the pre-charge power supply line 115.

The pre-charge circuit 150 includes k pre-charge selection circuits 152[1] to 152[k] provided corresponding to the respective k signal line groups, and k switch driving circuits 154[1] to 154[k] provided corresponding to the respective k pre-charge selection circuits 152[1] to 152[k].

Each pre-charge selection circuit 152 has eight pre-charge switches 152a[1] to 152a[8] each of which is coupled to each of the eight signal lines 111 included in a corresponding signal line group. That is, a pre-charge switch 152a is provided corresponding to the signal line 111. For example, one contact of each of the eight pre-charge switches 152a[1] to 152a[8] of a pre-charge selection circuit 152[i] is coupled to each of the eight signal lines 111 that are in an 8×i−7-th column to an 8×i-th column. In addition, the other contact of each of the eight pre-charge switches 152a[1] to 152a[8] of the pre-charge selection circuit 152[i], that is, the contact not coupled to the signal line 111, is commonly coupled to the pre-charge power supply line 115. The pre-charge power supply line 115 is coupled to the pre-charge power supply 220 of the drive integrated circuit 200 via the flexible circuit board 300.

The pre-charge switches 152a[1] to 152a[8] of the pre-charge selection circuit 152[i], based on respective coupling control signals CL[1, i] to CL[8, i], switch electrical coupling states between each of the signal lines 111 and the pre-charge power supply line 115 between the conductive state and the non-conductive state. For example, each of the pre-charge switches 152a[1] to 152a[8] is an N-channel type transistor constituted by a TFT or the like, and is set to either the conductive state or the non-conductive state in accordance with a level of a coupling control signal CL received by a control terminal such as a gate. Note that each of the pre-charge switches 152a[1] to 152a[8] may be a switching element other than TFTs. The pre-charge switch 152a is an example of a switch such as the first switch and the second switch. The coupling control signal CL is an example of the first coupling control signal and a second coupling control signal.

In a normal operation of displaying an image in accordance with the image signal S, as the coupling control signals CL[1, i] to CL[8, i], the pre-charge control signals PSL[1] to PSL[8] are supplied from the switch driving circuit 154[i] to the respective pre-charge switches 152a[1] to 152a[8] of the pre-charge selection circuit 152[i]. In FIG. 4, operation of the pre-charge switch 152a will be described focusing on the normal operation.

In the normal operation, the respective pre-charge switches 152a[1] to 152a[8] of each of the pre-charge selection circuits 152 receive the pre-charge control signals PSL[1] to PSL[8] via the pre-charge control signal lines 113 and the switch driving circuits 154[i] from the signal line driving circuit 210 of the drive integrated circuit 200. The pre-charge control signal line 113 is coupled to the signal line driving circuit 210 of the drive integrated circuit 200 via the flexible circuit board 300. Each of the pre-charge control signals PSL[1] to PSL[8] specifies a start timing for outputting the pre-charge signal PRC to the signal line 111.

For example, when one pre-charge control signal PSL[1] is at the high level and the other seven pre-charge control signals PSL[2] to PSL[8] are at the low level, only the k pre-charge switches 152a[1] included in the respective k pre-charge selection circuits 152[1] to 152[k] are brought into the conductive state. Accordingly, each of the k pre-charge selection circuits 152[1] to 152[k] outputs the pre-charge signal PRC supplied to the pre-charge power supply line 115 to the signal line 111 in the first sequence of a corresponding signal line group. Hereinafter, similarly, each of the k pre-charge selection circuits 152[1] to 152[k] outputs the pre-charge signal PRC supplied to the pre-charge power supply line 115 to the signal lines 111 in the second sequence, the third sequence, the fourth sequence, the fifth sequence, the sixth sequence, the seventh sequence, and the eighth sequence of a corresponding signal line group.

Each switch drive circuit 154 includes eight AND circuits 154a[1] to 154a[8] that operate with a power supply voltage supplied from the first power supply 230 and the second power supply 232. An AND circuit 154a is an example of a signal selection circuit such as the first signal selection circuit and the second signal selection circuit, and is provided corresponding to the pre-charge switch 152a. That is, circuit groups each of which includes the pre-charge switch 152a and the AND circuit 154a provided corresponding to the pre-charge switch 152a are provided corresponding to the n signal lines 111 in a one-to-one manner. Accordingly, the pre-charge circuit 150 includes the n circuit groups each of which includes the pre-charge switch 152a and the AND circuit 154a, as n processing circuits provided corresponding to the n signal lines 111 in a one-to-one manner.

Each AND circuit 154a outputs an arithmetic operation result of a logical product of signals received at respective two input terminals. For example, each AND circuit 154a has a first NAND circuit 154b, and a first inverter 154c whose input terminal is coupled to an output terminal of the first NAND circuit 154b. The first NAND circuit 154b outputs an arithmetic operation result of a negative logical product of signals received at respective two input terminals to the first inverter 154c. Additionally, the first inverter 154c outputs an inverted signal of the signal received at the input terminal.

For example, an AND circuit 154a[j] of the switch driving circuit 154[i] outputs an arithmetic operation result of a logical product of signals received at respective two input terminals of a pre-charge switch 152 a[j] of the pre-charge selection circuit 152[i]. Note that i is a natural number from 1 to k, and j is a natural number that is equal to or greater than 1 and that is equal to or less than 8.

The two input terminals of the AND circuit 154a[j] of the switch driving circuit 154[i] are the two input terminals of the first NAND circuit 154b, and are individually coupled to an output terminal of a fourth inverter 162e of a unit circuit 162[i] to be described later, and the pre-charge control signal line 113 in a j-th sequence. Further, an output terminal of the AND circuit 154a[j] of the switch driving circuit 154[i] is an output terminal of the first inverter 154c, and is coupled to a control terminal of the pre-charge switch 152a[j] of the pre-charge selection circuit 152[i].

In other words, the switch driving circuit 154[i] outputs the coupling control signals CL[1, i] to CL[8, i] generated by each logical product between each of the pre-charge control signals PSL[1] to PSL[8] and an inspection control signal SOUT[i], to the pre-charge switches 152a[1] to 152a[8] of the pre-charge selection circuit 152[i]. The high level and the low level of an inspection control signal SOUT are examples of the first logic level and the second logic level respectively.

In the inspection operation for inspecting the signal line 111, when the inspection control signal SOUT[i] is at the high level, the AND circuit 154a[j] of the switch driving circuit 154[i] outputs a pre-charge control signal PSL[j] as a coupling control signal CL[j, i] to the control terminal of the pre-charge switch 152a[j] of the pre-charge selection circuit 152[i].

Further, when the inspection control signal SOUT[i] is at the low level, the AND circuit 154a[j] of the switch driving circuit 154[i] outputs the low level inspection control signal SOUT[i] as the coupling control signal CL[j, i], to the control terminal of the pre-charge switch 152a[j] of the pre-charge selection circuit 152[i]. In other words, when the inspection control signal SOUT[i] is at the low level, the switch driving circuit 154[i] outputs the coupling control signal CL for setting the pre-charge switch 152a to the non-conductive state to the pre-charge switches 152a[1] to 152a[8] of the pre-charge selection circuit 152[i].

Further, in the normal operation, the inspection control signals SOUT[1] to SOUT[k] are maintained at the high level. Thus, in the normal operation, the AND circuit 154a[j] of the switch driving circuit 154[i] outputs the pre-charge control signal PSL[j] as the coupling control signal CL[j, i], to the control terminal of the pre-charge switch 152a[j] of the pre-charge selection circuit 152[i]. In other words, the AND circuit 154a[j] of the switch driving circuit 154[i] generates the coupling control signal CL[j, i] with a logical operation of the inspection control signal SOUT[i] and the pre-charge control signal PSL[j].

Note that the inspection control signal SOUT[i] indicates whether the signal line 111 coupled to the pre-charge selection circuit 152[i] is to be inspected. For example, when the signal line 111 coupled to the pre-charge switch 152a of the pre-charge selection circuit 152[i] is selected as an inspection target, the inspection control signal SOUT[i] is set to the high level. That is, when the signal line 111 coupled to the pre-charge switch 152a of the pre-charge selection circuit 152[i] is not selected as an inspection target, the inspection control signal SOUT[i] is set to the low level.

Thus, in the inspection operation, when the corresponding pre-charge switch 152a is selected by the inspection control signal SOUT, the AND circuit 154a outputs the pre-charge control signal PSL as the coupling control signal CL to the pre-charge switch 152a. For example, in the inspection operation, when the inspection control signal SOUT[1] indicates that the signal line 111 in the first sequence is to be inspected, the AND circuit 154a[1] of the switch driving circuit 154[1] outputs the pre-charge control signal PSL[1] as a coupling control signal CL[1, 1] to the pre-charge switch 152a[1] of the pre-charge selection circuit 152[1].

Further, in the inspection operation, when the corresponding pre-charge switch 152a is not selected by the inspection control signal SOUT, the AND circuit 154a outputs the coupling control signal CL for setting the pre-charge switch 152a to the non-conductive state to the pre-charge switch 152a. For example, in the inspection operation, when the inspection control signal SOUT[1] indicates that the signal line 111 in first sequence is not to be inspected, the AND circuit 154a[1] of the switch driving circuit 154[1] outputs the coupling control signal CL[1, 1] for setting the pre-charge switch 152a[1] of the pre-charge selection circuit 152[1] to the non-conductive state to the pre-charge switch 152a[1] of the pre-charge selection circuit 152[1].

Additionally, in the normal operation, the AND circuit 154a outputs the pre-charge control signal PSL as the coupling control signal CL to the pre-charge switch 152a. For example, the AND circuit 154a[1] of the switch driving circuit 154[1], in the normal operation, outputs the pre-charge control signal PSL[1] as the coupling control signal CL[1, 1] to the pre-charge switch 152a[1] of the pre-charge selection circuit 152[1].

The inspection circuit 160 is, for example, a shift register, and outputs the inspection control signal SOUT that indicates a signal line group including the signal line 111 to be inspected to the switch driving circuit 154. For example, the inspection circuit 160 includes a first clocked inverter 161a, a second inverter 161b, a second clocked inverter 161c, and k unit circuits 162[1] to 162[k]. Note that, in the following, operation of the inspection circuit 160 and the like will be described, with respective two terminals of a clocked inverter such as the first clocked inverter 161a that receive clock signals being a first clock terminal and a second clock terminal.

An input terminal of the first clocked inverter 161a is coupled to the fourth inspection pad 174, and an output terminal of the first clocked inverter 161a is coupled to an input terminal of the second inverter 161b. Then, the first clocked inverter 161a operates based on the first clock signal CLK received at the first clock terminal and the second clock signal CLKB received at the second clock terminal. For example, the first clocked inverter 161a operates as an inverter when the first clock signal CLK is at the high level and the second clock signal CLKB is at the low level, and sets the output terminal to high impedance when the first clock signal CLK is at the low level and the second clock signal CLKB is at the high level.

The second inverter 161b outputs an inverted signal of a signal received at the input terminal. The input terminal of the second inverter 161b is coupled to the output terminal of the first clocked inverter 161a and an output terminal of the second clocked inverter 161c. An output terminal of the second inverter 161b is coupled to an input terminal of the second clocked inverter 161c and an input terminal of the unit circuit 162[1].

The input terminal of the second clocked inverter 161c is coupled to the output terminal of the second inverter 161b, and the output terminal of the second clocked inverter 161c is coupled to the input terminal of the second inverter 161b.

Further, the second clocked inverter 161c operates based on the second clock signal CLKB received at the first clock terminal and the first clock signal CLK received at the second clock terminal. For example, the second clocked inverter 161c operates as an inverter when the second clock signal CLKB is at the high level and the first clock signal CLK is at the low level, and sets the output terminal to high impedance when the second clock signal CLKB is at the low level and the first clock signal CLK is at the high level.

The k unit circuits 162[1] to 162[k] correspond to respective steps of a shift register, for example. For example, each unit circuit 162 includes a third clocked inverter 162a, a third inverter 162b, a fourth clocked inverter 162c, a second NAND circuit 162d, the fourth inverter 162e, and an inspection mode control switch 162f. In a odd-numbered unit circuit 162 such as the unit circuit 162[1], the third clocked inverter 162a operates based on the second clock signal CLKB received at the first clock terminal and the first clock signal CLK received at the second clock terminal, and the fourth clocked inverter 162c operates based on the first clock signal CLK received at the first clock terminal and the second clock signal CLKB received at the second clock terminal. Also in a even-numbered unit circuit 162 such as the unit circuit 162[2], the third clocked inverter 162a operates based on the first clock signal CLK received at the first clock terminal and the second clock signal CLKB received at the second clock terminal, and the fourth clocked inverter 162c operates based on the second clock signal CLKB received at the first clock terminal and the first clock signal CLK received at the second clock terminal.

When the unit circuit 162[i] is the unit circuit 162[1], an input terminal of the third clocked inverter 162a is coupled to the output terminal of the second inverter 161b, and an output terminal of the third clocked inverter 162a is coupled to an input terminal of the third inverter 162b. When the unit circuit 162[i] is any one of the unit circuits 162[2] to 162[k], the input terminal of the third clocked inverter 162a is coupled to an output terminal of the third inverter 162b of the pre-stage unit circuit 162[i−1], and the output terminal of the third clocked inverter 162a is coupled to the input terminal of the third inverter 162b.

When the unit circuit 162[i] is the odd-numbered unit circuit 162, the third clocked inverter 162a operates as an inverter when the second clock signal CLKB is at the high level and the first clock signal CLK is at the low level, and sets the output terminal to high impedance when the second clock signal CLKB is at the low level and the first clock signal CLK is at the high level. Further, when the unit circuit 162[i] is the even-numbered unit circuit 162, the third clocked inverter 162a operates as an inverter when the first clock signal CLK is at the high level and the second clock signal CLKB is at the low level, and sets the output terminal to high impedance when the first clock signal CLK is at the low level and the second clock signal CLKB is at the high level.

The third inverter 162b of the unit circuit 162[i] outputs an inverted signal of a signal received at the input terminal. The input terminal of the third inverter 162b is coupled to the output terminal of the third clocked inverter 162a and an output terminal of the fourth clocked inverter 162c. When the unit circuit 162[i] is any one of the unit circuits 162[1] to 162[k−1], the output terminal of the third inverter 162b is coupled to an input terminal of the fourth clocked inverter 162c and an input terminal of a next-stage unit circuit 162[i+1]. When the unit circuit 162[i] is the unit circuit 162[k], the output terminal of the third inverter 162b is coupled to the input terminal of the fourth clocked inverter 162c.

The input terminal of the fourth clocked inverter 162c of the unit circuit 162[i] is coupled to the output terminal of the third inverter 162b, and the output terminal of the fourth clocked inverter 162c is coupled to the input terminal of the third inverter 162b. When the unit circuit 162[i] is the odd-numbered unit circuit 162, the fourth clocked inverter 162c operates as an inverter when the first clock signal CLK is at the high level and the second clock signal CLKB is at the low level, and sets the output terminal to high impedance when the first clock signal CLK is at the low level and the second clock signal CLKB is at the high level. Further, when the unit circuit 162[i] is the even-numbered unit circuit 162, the fourth clocked inverter 162c operates as an inverter when the second clock signal CLKB is at the high level and the first clock signal CLK is at the low level, and sets the output terminal to high impedance when the second clock signal CLKB is at the low level and the first clock signal CLK is at the high level.

The second NAND circuit 162d of the unit circuit 162[i] outputs an arithmetic operation result of a negative logical product of signals received at respective two input terminals. The two input terminals of the second NAND circuit 162d are individually coupled to the input terminal of the third clocked inverter 162a and the output terminal of the third inverter 162b, and an output terminal of the second NAND circuit 162d is coupled to an input terminal of the fourth inverter 162e.

The fourth inverter 162e of the unit circuit 162[i] outputs an inverted signal of a signal received at the input terminal. The input terminal of the fourth inverter 162e is coupled to the output terminal of the second NAND circuit 162d. Additionally, the output terminal of the fourth inverter 162e of the unit circuit 162[i] is commonly coupled to respective input terminals of the AND circuits 154a[1] to 154a[8] of the switch driving circuit 154[i]. In other words, the fourth inverter 162e of the unit circuit 162[i] outputs the inspection control signal SOUT[i] to the AND circuits 154a[1] to 154a[8] of the switch driving circuit 154[i].

One contact of the inspection mode control switch 162f of the unit circuit 162[i] is coupled to the input terminal of the fourth inverter 162e of the unit circuit 162[i]. The other contact of the inspection mode control switch 162f of the unit circuit 162[i], that is, a contact not coupled to the input terminal of the fourth inverter 162e, is supplied with the first power supply voltage VSSY from the first power supply 230 that is a low potential side power supply. For example, the other contact of the inspection mode control switch 162f is coupled to the low potential side power supply line 116. A control terminal of the inspection mode control switch 162f is coupled to the fifth inspection pad 175 to which the inspection mode signal TX is supplied. Note that the fifth inspection pad 175 is coupled to the high potential side power supply line 117 to which the second power supply voltage VDDY is supplied via a pull-up resistor 164.

The inspection mode control switch 162f is an N-channel type transistor constituted by a TFT or the like, for example, and is set to either the conductive state or the non-conductive state in accordance with a level of the inspection mode signal TX received at the control terminal such as a gate. Note that the inspection mode control switch 162f may be a switching element other than TFTs.

The third clocked inverter 162a, the third inverter 162b, the fourth clocked inverter 162c, and the second NAND circuit 162d operate, for example, with the third power supply voltage VDDX supplied from the first inspection pad 171 and the first power supply voltage VSSY supplied from the low potential side power supply line 116 being power supply voltages. The fourth inverter 162e and the inspection mode control switch 162f operate with the second power supply voltage VDDY supplied from the high potential side power supply line 117 and the first power supply voltage VSSY supplied from the low potential side power supply line 116 being power supply voltages.

In the example illustrated in FIG. 4, the pre-charge switch 152a is disposed on the side in the first direction D1 with respect to the display region 120, the switch driving circuit 154 is disposed on the side in the first direction D1 with respect to the pre-charge switch 152a, and the inspection circuit 160 is disposed on the side in the first direction D1 with respect to the switch driving circuit 154.

By disposing the switch driving circuit 154 close to the pre-charge switch 152a, an increase in a drive load when the pre-charge switch 152a is driven can be reduced. Next, a normal operation of the electro-optical device 1 will now be described with reference to FIG. 5.

Figure 5:
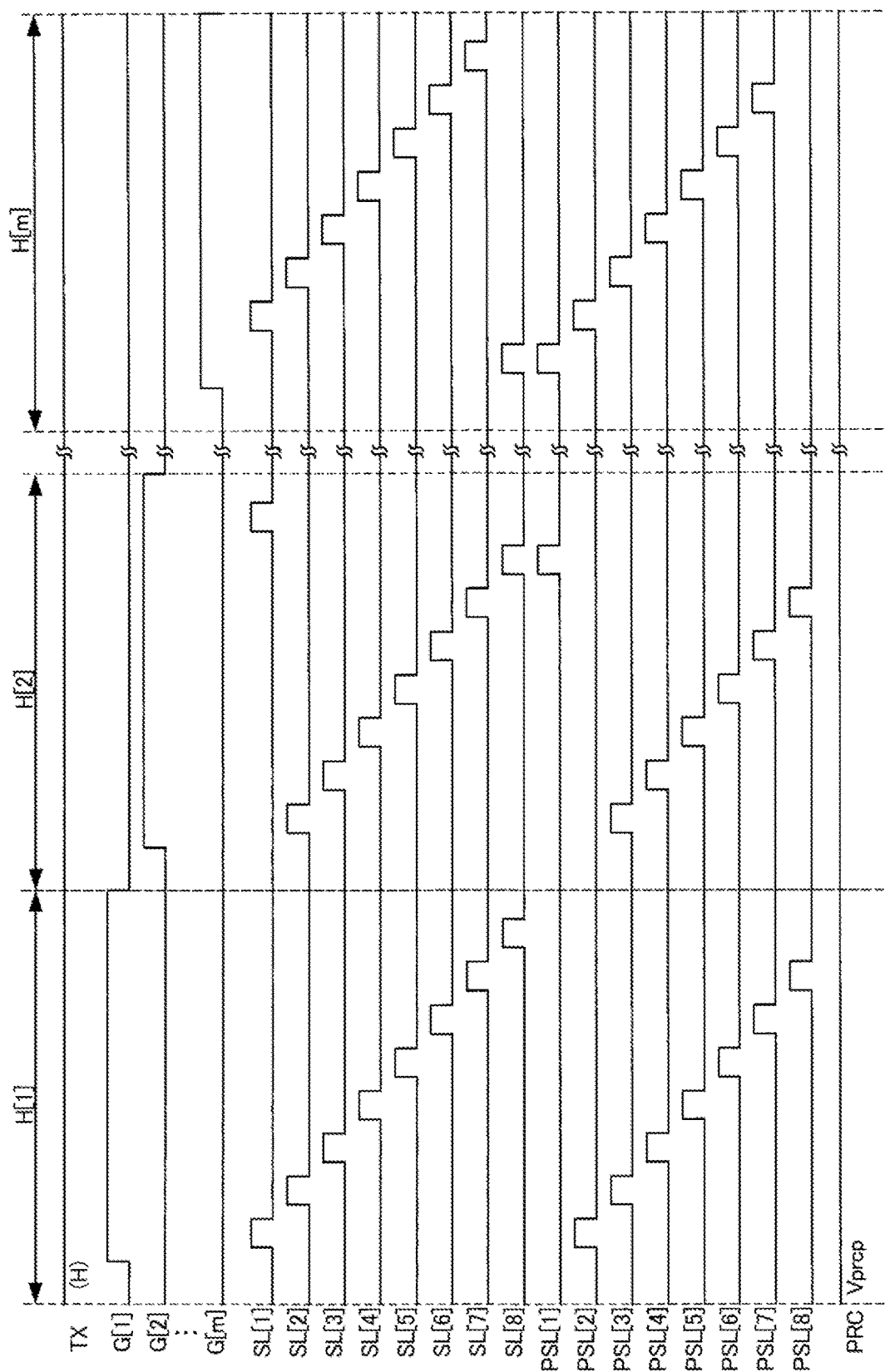
FIG. 5 is a diagram illustrating an example of operation timings of the electro-optical device according to First Exemplary Embodiment.

FIG. 5 is a diagram illustrating an example of an operation timing of the electro-optical device 1 according to First Exemplary Embodiment. Note that FIG. 5 illustrates an operation timing of a normal operation in each horizontal scanning period H in positive polarity driving. In the normal operation, for example, the first inspection pad 171, the second inspection pad 172, the third inspection pad 173, the fourth inspection pad 174, the fifth inspection pad 175, the sixth inspection pad 176, and the like are set to high impedance.

In the normal operation, since the fifth inspection pad 175 is set to high impedance, the inspection mode signal TX is maintained at the high level by the pull-up resistor 164. In this case, the inspection mode control switch 162f is set to the conductive state, and thus the inspection control signals SOUT[1] to SOUT[k] are maintained at the high level. Thus, in the normal operation, the AND circuit 154a outputs the pre-charge control signal PSL as the coupling control signal CL to the pre-charge switch 152a. As a result, the pre-charge circuit 150 performs pre-charge in accordance with the pre-charge control signals PSL[1] to PSL[8].

A first horizontal scanning period H[1] is the horizontal scanning period H for writing a video voltage based on the image signal S to the pixels 122 in the first row. In the first horizontal scanning period H[1], a potential of the scanning signal G[1] to be supplied to the scanning line 110 in the first row is set to the high level. The scanning signals G[2] to G[m] to be supplied to the scanning lines 110 in rows other than the first row are maintained at the low level. A high level period of each of the write selection signals SL[1] to SL[8] is switched in order of the write selection signals SL[1] to SL[8]. In other words, a supply period of the image signal S is assigned in order, to the signal line 111 in each of the sequences, from the signal line 111 in the first sequence to the signal line 111 in the eighth sequence. As a result, the image signal S is supplied to the signal line 111 in each of the sequences in order.

Furthermore, a high level period of each of the pre-charge control signals PSL[2] to PSL[8] is switched in accordance with switching of a high level period of each of the write selection signals SL[1] to SL[7]. For example, the pre-charge control signal PSL[2] transits to the high level in synchronization with a timing when the write selection signal SL[1] transits to the high level, and then transits to the low level after a predetermined time period elapses. Pre-charge is performed for the signal line 111 in the second sequence, in a pre-charge period for the second sequence in which the pre-charge control signal PSL[2] is maintained at the high level. In other words, the pre-charge signal PRC is supplied to the signal line 111 in the second sequence in the pre-charge period for the second sequence. Thus, the signal line 111 in the second sequence is charged to a positive polarity pre-charge voltage Vprcp based on the pre-charge signal PRC. Note that, in the first horizontal scanning period H[1], the pre-charge control signal PSL[1] is maintained at the low level.

In a second horizontal scanning period H[2], a potential of the scanning signal G[2] to be supplied to the scanning line 110 in a second row is set to the high level, and the scanning signals G to be supplied to the scanning lines 110 in rows other than the second row are maintained at the low level. The second horizontal scanning period H[2] is different from the first horizontal scanning period H[1] in the order of when the image signal S is supplied to the signal line 111 in each of the sequences from the first sequence to the eighth sequence in order. For example, the high level period of each of the write selection signals SL[1] to SL[8] is switched in the order of the write selection signals SL[2] to SL[8] and SL[1]. The high level period of each of the pre-charge control signals PSL[3] to PSL[8] and PSL[1] is switched in the order in accordance with switching of the high level period of each of the write selection signals SL[2] to SL[8]. Note that the pre-charge control signal PSL[2] is maintained at the low level in the second horizontal scanning period H[2].

In an m-th horizontal scanning period H[m], a potential of the scanning signal G[m] to be supplied to the scan line 110 in an m-th row is set to the high level, and the scanning signals G to be supplied to the scanning line 110 in rows other than the m-th row are maintained at the low level. In the example illustrated in FIG. 5, m is a multiple of 8. The m-th horizontal scanning period H[m] is different from the first horizontal scanning period H[1] in the order of when the image signal S is supplied to the signal line 111 in each of the sequences from the first sequence to the eighth sequence in order. For example, the high level period of each of the write selection signals SL[1] to SL[8] is switched in the order of the write selection signals SL[8] and SL[1] to SL[7]. The high level period of each of the pre-charge control signals PSL[1] to PSL[7] is switched in order in accordance with switching of the high level period of each of the write selection signals SL[8] and SL[1] to SL[6]. Note that the pre-charge control signal PSL[8] is maintained at the low level in the m-th horizontal scanning period H[m]. In the operation timing illustrated in FIG. 5, in the electro-optical device 1, the signal line 111 to be supplied with the image signal S in a first supply period is made different for eight of the horizontal scanning periods H.

Note that, in an operation timing of each horizontal scanning period H in negative polarity driving, the signal line 111 is charged to a negative polarity pre-charge voltage based on the pre-charge signal PRC in a pre-charge operation. The scanning signal G, the write selection signal SL, and the pre-charge control signal PSL are controlled similarly as in the case of the positive polarity driving. Next, with reference to FIG. 6, a signal supplied to the electro-optical panel 100 in inspecting a state of the signal line 111 will be described.

Figure 6:
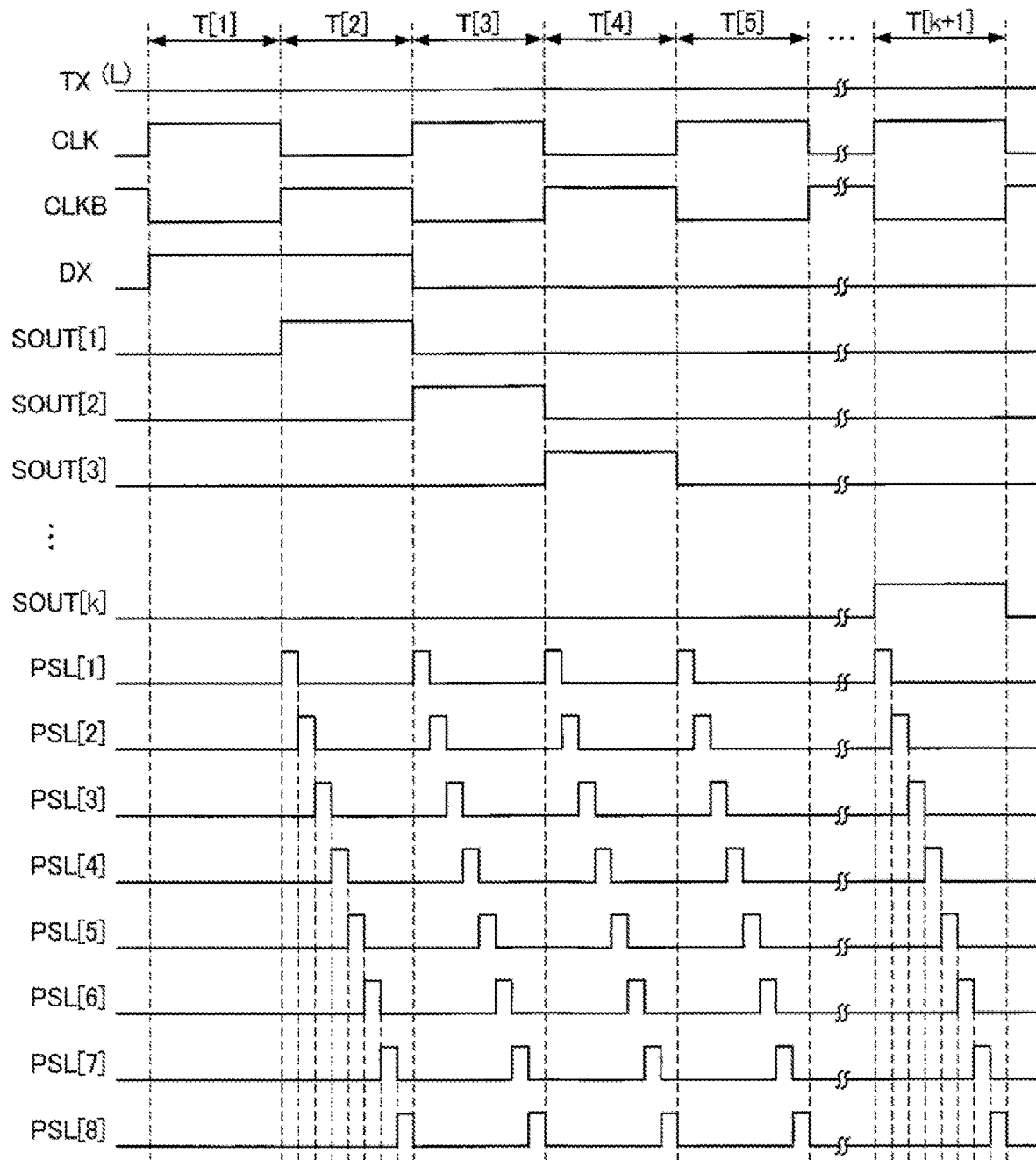
FIG. 6 is a diagram illustrating an example of a signal supplied to an electro-optical panel in inspecting a state of a signal line.

FIG. 6 is a diagram illustrating an example of the signal supplied to the electro-optical panel 100 in inspecting a state of the signal line 111. In an inspection operation for inspecting a status of the signal line 111, the first clock signal CLK is supplied to the second inspection pad 172, the second clock signal CLKB is supplied to the third inspection pad 173, and the low level inspection mode signal TX is supplied to the fifth inspection pad 175. In this case, the inspection mode control switch 162f is set to the non-conductive state.

In the inspection operation, the start pulse DX whose high level period is one period of the first clock signal CLK is supplied to the fourth inspection pad 174. In this case, the inspection control signals SOUT[1] to SOUT[k] each of which the high level period is 0.5 periods of the first clock signal CLK are sequentially outputted in synchronization with rising of the first clock signal CLK and rising of the second clock signal CLKB. Note that, each of the pre-charge control signals PSL[1] to PSL[8] that sequentially sets the respective pre-charge switches 152a[1] to 152a[8] to the conductive state in a period T in which the inspection control signal SOUT is at the high level, is supplied to the inspection pad of the pre-charge control signal line 113 in each of the sequences.

For example, in a period T[2], only the inspection control signal SOUT[1] of the inspection control signals SOUT[1] to SOUT[k] is at the high level, so the pre-charge switches 152a[1] to 152a[8] of the pre-charge selection circuit 152[1] are set to the conductive state in order. In other words, in the period T[2], the respective signal lines 111 in the first row to the eighth row are sequentially coupled to the pre-charge power supply line 115.

Further, for example, in a period T[k+1], only the inspection control signal SOUT[k] of the inspection control signals SOUT[1] to SOUT[k] is at the high level, so the pre-charge switches 152a[1] to 152a[8] of the pre-charge selection circuit 152[k] are set to the conductive state in order. In other words, in the period T[k+1], the respective signal lines 111 in an n−7 row to an n-th row are sequentially coupled to the pre-charge power supply line 115. Next, with reference to FIG. 7, a short-circuit inspection for inspecting a short-circuit of the signal lines 111 adjacent to each other will be described.

Figure 7:
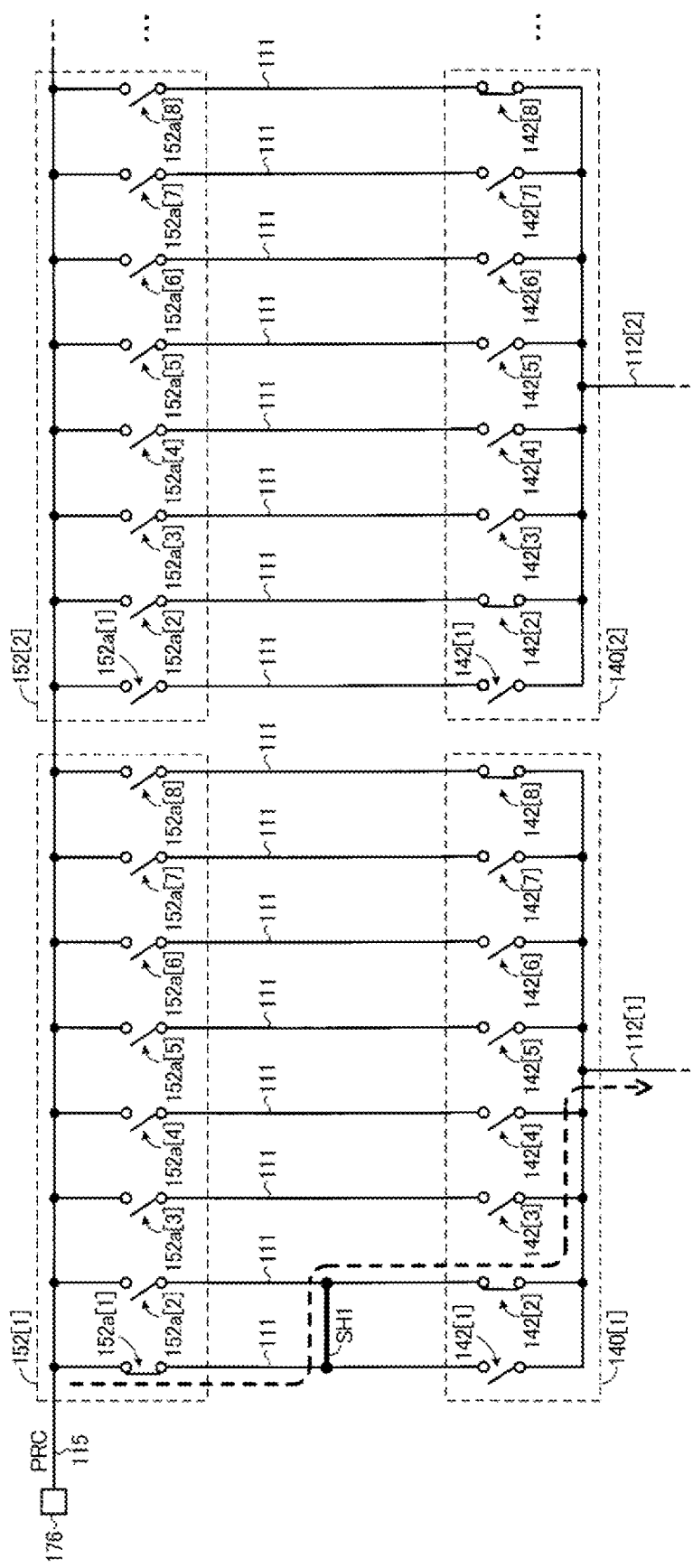
FIG. 7 is an explanatory diagram of a short-circuit inspection for inspecting a short-circuit of signal lines adjacent to each other.

FIG. 7 is an explanatory diagram of the short-circuit inspection for inspecting a short-circuit of the signal lines 111 adjacent to each other. Note that, in FIG. 7, the short-circuit inspection will be described using an example of a case in which a short-circuit of the signal line 111 coupled to the demultiplexer 140[1] is inspected. For example, in a period in which the pre-charge switch 152a[1] is set to the conductive state, the writing switch 142[2] coupled to the signal line 111 in the second sequence, and the writing switch 142[8] coupled to the signal line 111 in the eighth sequence that are adjacent to the signal line 111 in the first sequence are set to the conductive state by the write selection signals SL[2] and SL[8], respectively.

For example, when a short-circuit part SH1 exists between the signal line 111 in the first sequence and the signal line 111 in the second sequence of a signal line group corresponding to the demultiplexer 140[1], a current flows by applying a potential difference between the sixth inspection pad 176 and an inspection pad (not illustrated) in the data line 112[1]. Thus, a short-circuit between the signal line 111 in the first sequence and the signal line 111 in the second sequence of the signal line group corresponding to the demultiplexer 140[1] can be detected. Note that, when the signal line 111 in the first sequence and the signal line 111 in the second sequence of the signal line group corresponding to the demultiplexer 140[1] are not short-circuited, a current does not flow even when a potential difference is applied between the sixth inspection pad 176 and an inspection pad (not illustrated) in the data line 112[1]. Next, with reference to FIG. 8, a disconnection inspection for inspecting a disconnection of the signal line 111 will be described.

Figure 8:
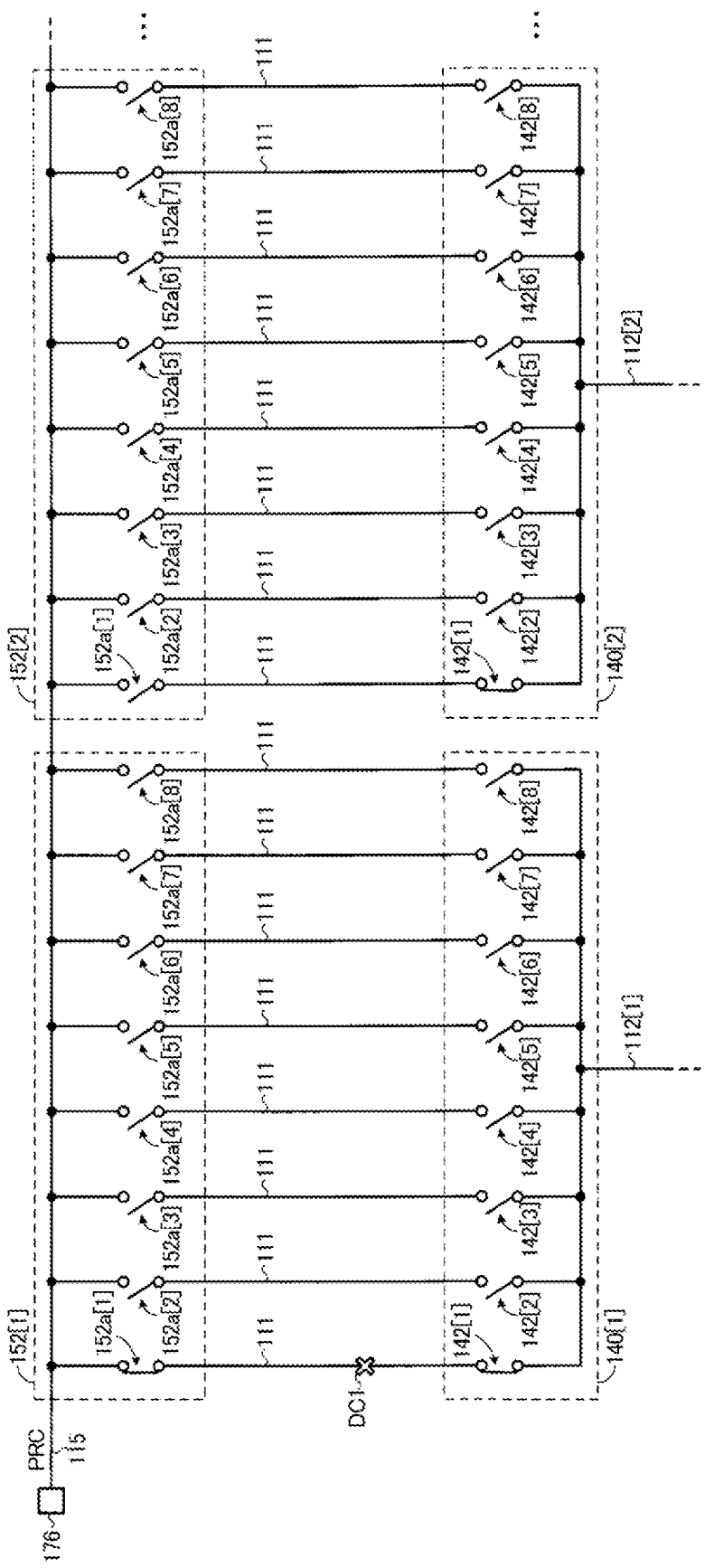
FIG. 8 is an explanatory diagram of a disconnection inspection for inspecting a disconnection of a signal line.

FIG. 8 is an explanatory diagram of the disconnection inspection for inspecting a disconnection of the signal line 111. Note that, with reference to FIG. 8, the disconnection inspection is described using an example of a case in which a disconnection of the signal line 111 coupled to the demultiplexer 140[1] is inspected. For example, in a period in which the pre-charge switch 152a[1] is set to the conductive state, the writing switch 142[1] coupled to the signal line 111 in the first sequence is set to the conductive state by the write selection signal SL[1]. A cross mark in FIG. 8 denotes a disconnection of the line.

For example, when a disconnection portion DC1 exists in the signal line 111 in the first sequence of the signal line group corresponding to the demultiplexer 140[1], a current does not flow even when a potential difference is applied between the sixth inspection pad 176 and an inspection pad (not illustrated) of the data line 112[1]. Compared to this, when the signal line 111 is not disconnected, a current flows, for example, by applying a potential difference between the sixth inspection pad 176 and an inspection pad (not illustrated) in the data line 112[1]. In other words, a disconnection of the signal line 111 can be detected by applying a potential difference between the sixth inspection pad 176 and the data line 112.

In the electro-optical device 1, in the inspection operation, the pre-charge switch 152a, as a switch for inspection, is controlled by the coupling control signal CL generated based on a logical product of the inspection control signal SOUT indicating the signal line 111 to be inspected and the pre-charge control signal PSL. That is, in the electro-optical device 1, the pre-charge switch 152a is also used as the switch for inspection. Thus, in the electro-optical device 1, the number of switches coupled to the signal line 111 can be reduced in comparison to a configuration in which the pre-charge switch 152a and the switch for inspection are individually provided. That is, in the electro-optical device 1, disposal pitches among the pre-charge switches 152a, the signal lines 111, and the like can be made narrower than those of the configuration in which the pre-charge switch 152a and the switch for inspection are individually provided. As a result, in the electro-optical device 1, the pre-charge switches 152a, the signal lines 111, and the like can be disposed at narrow pitches.

As described above, in First Exemplary Embodiment, the electro-optical device 1 includes, when a direction in which one signal line 111 of n signal lines 111 extends is the first direction D1 with an input end of the image signal S on the one signal line 111 being a starting point, the pre-charge circuit 150 and the inspection circuit 160 that are disposed on the side in the first direction D1 with respect to the display region 120 that displays an image. In the inspection operation for inspecting the n signal lines 111, the inspection circuit 160 outputs the inspection control signal SOUT for selecting the signal line 111 to be inspected of the n signal lines 111 to the pre-charge circuit 150.

In addition, the pre-charge circuit 150 supplies the pre-charge signal PRC to the n signal lines 111 in a predetermined order based on the pre-charge control signal PSL. For example, the pre-charge circuit 150 includes n circuit groups each of which includes the pre-charge switch 152a and the AND circuit 154a, as n processing circuits provided corresponding to the n signal lines 111 in a one-to-one manner. That is, one processing circuit includes the pre-charge switch 152a and the AND circuit 154a.

The pre-charge switch 152a switches an electrical coupling state between one signal line 111 and the pre-charge power supply line 115 to which the pre-charge signal PRC is supplied, between the conductive state and the non-conductive state, based on the coupling control signal CL.

The AND circuit 154a that acts as a signal selection circuit, in the inspection operation, outputs the pre-charge control signal PSL as the coupling control signal CL to the pre-charge switch 152a, when the pre-charge switch 152a is selected based on the inspection control signal SOUT. Further, the AND circuit 154a, in the inspection operation, outputs the coupling control signal CL for setting the pre-charge switch 152a to the non-conductive state to the pre-charge switch 152a, when the pre-charge switch 152a is not selected by the inspection control signal SOUT. In addition, the AND circuit 154a, in the normal operation in which an image is displayed in accordance with the image signal S, outputs the pre-charge control signal PSL as the coupling control signal CL to the pre-charge switch 152a.

That is, in the electro-optical device 1, the pre-charge switch 152a is also used as the switch for inspection. Thus, in the electro-optical device 1, disposal pitches between the pre-charge switches 152a, the signal lines 111, and the like can be made narrower than those of the configuration in which the pre-charge switch 152a and the switch for inspection are individually provided. As a result, in the electro-optical device 1, the pre-charge switches 152a, the signal lines 111, and the like can be disposed at narrow pitches.

Second Exemplary Embodiment

A main difference between Second Exemplary Embodiment and First Exemplary Embodiment is that the eight pre-charge control signal lines 113 are divided into two signal line groups each of which includes the four pre-charge control signal lines 113, and the AND circuit 154a is disposed between the two signal line groups.

Figure 9:
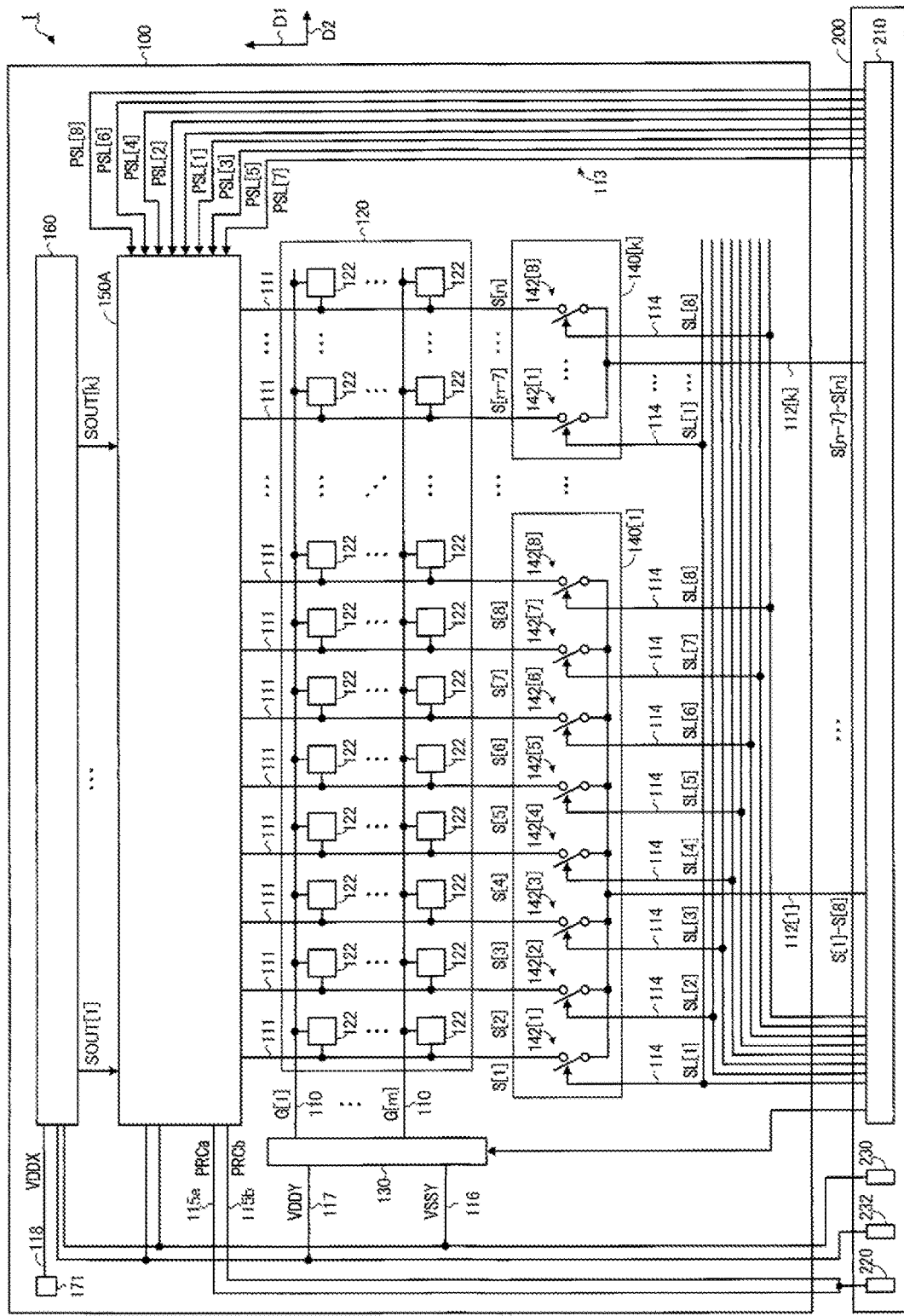
FIG. 9 is a block diagram illustrating a configuration of an electro-optical device according to Second Exemplary Embodiment.

FIG. 9 is a block diagram illustrating a configuration of the electro-optical device 1 according to Second Exemplary Embodiment. Elements that are identical to those described in FIGS. 1 to 8 are given identical reference signs, and detailed descriptions will be omitted. A meaning of the first direction D1 in FIG. 9 is identical to that of the first direction D1 in FIG. 2. In addition, a second direction D2 indicates a direction in which one scanning line 110 of the m scanning lines 110 extends in the electro-optical panel 100.

The electro-optical device 1 illustrated in FIG. 9 is identical to the electro-optical device 1 in FIG. 1, except for arrangement of the AND circuits 154a and the like in the electro-optical panel 100. For example, the electro-optical device 1 includes the electro-optical panel 100, the drive integrated circuit 200, and the flexible circuit board 300 in FIG. 1. The driving integrated circuit 200 is identical to the drive integrated circuit 200 in FIG. 2.

The electro-optical panel 100 illustrated in FIG. 9 includes a pre-charge circuit 150A instead of the pre-charge circuit 150 in FIG. 2, and includes two systems of pre-charge power supply lines 115a and 115b instead of a single system of the pre-charge power supply line 115. The other configurations of the electro-optical panel 100 in FIG. 9 are identical to those of the electro-optical panel 100 in FIG. 2. For example, the electro-optical panel 100 includes the m scanning lines 110, the n signal lines 111, the pre-charge control signal line 113, the pre-charge power supply lines 115a and 115b, the display region 120, the scanning line drive circuit 130, the k demultiplexers 140[1] to 140[k], the pre-charge circuit 150A, and the inspection circuit 160. Note that, in the present exemplary embodiment, the signal lines 111 are divided into eight sequences, so the number of the pre-charge control signal lines 113 is eight.

Note that, in FIG. 9, as in FIG. 2, a description of the inspection pads other than the first inspection pad 171 is omitted for ease of illustration. In FIG. 9 and later, the pre-charge signal PRC supplied to the pre-charge power supply line 115a is also referred to as a pre-charge signal PRCa, and the pre-charge signal PRC supplied to the pre-charge power supply line 115b is also referred to as a pre-charge signal PRCb.

The pre-charge circuit 150A is supplied with the pre-charge signals PRCa and PRCb from the two systems of the pre-charge power supply lines 115a and 115b, respectively. Details of the pre-charge circuit 150A will be described using FIG. 10.

Figure 10:
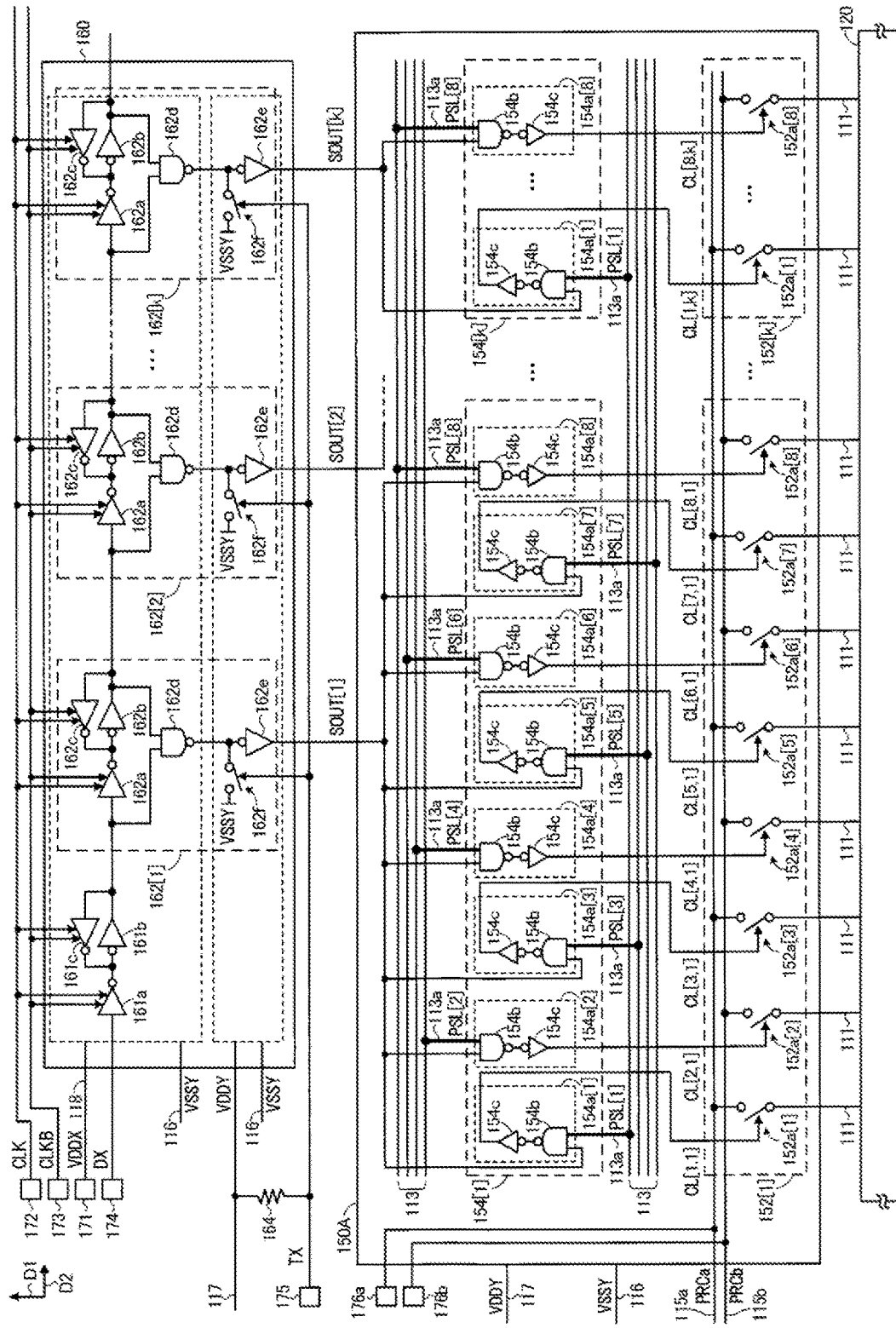
FIG. 10 is a circuit diagram illustrating a configuration of a pre-charge circuit and an inspection circuit in FIG. 9.

FIG. 10 is a circuit diagram illustrating a configuration of the pre-charge circuit 150A and the inspection circuit 160 in FIG. 9. A meaning of the first direction D1 and the second direction D2 in FIG. 10 is identical to that of the first direction D1 and the second direction D2 in FIG. 9. In the pre-charge circuit 150A illustrated in FIG. 10, the pre-charge power supply lines 115a and 115b are coupled to the sixth inspection pads 176a and 176b, respectively. The inspection circuit 160 is identical to the inspection circuit 160 in FIG. 4. Thus, in FIG. 10, the pre-charge circuit 150A is described centrally.

The pre-charge circuit 150A is identical to the pre-charge circuit 150 in FIG. 4, except that the pre-charge signals PRCa and PRCb are supplied from the two systems of the pre-charge power supply lines 115a and 115b, respectively, and except for arrangement of the switch driving circuit 154. For example, the pre-charge circuit 150A includes the k pre-charge selection circuits 152[1] to 152[k] provided corresponding to the respective k signal line groups, and the k switch driving circuits 154[1] to 154[k] provided corresponding to the respective k pre-charge selection circuits 152[1] to 152[k].

One contact of each of the eight pre-charge switches 152a[1] to 152a[8] of the pre-charge selection circuit 152[i] is coupled to each of the eight signal lines 111 that are in an 8×i−7-th row to an 8×i-th row, similar to the pre-charge switch 152a in FIG. 4. Moreover, the other contact of each of the pre-charge switches 152a[1], 152a[3], 152a[5], and 152a[7] that are in the respective odd-numbered sequences of each of the pre-charge selection circuits 152, that is, the contact that is not coupled to the signal line 111, is commonly coupled to the pre-charge power supply line 115a. In addition, the other contact of each of the pre-charge switches 152a[2], 152a[4], 152a[6] and 152a[8] that are in the respective even-numbered sequences of each of the pre-charge selection circuit 152, that is, the contact that is not coupled to the signal line 111, is commonly coupled to the pre-charge power supply line 115b. The other configurations of the pre-charge circuit 150A are identical to those of the pre-charge circuit 150 in FIG. 4.

Further, in the example illustrated in FIG. 10, the eight pre-charge control signal lines 113 are divided into a first group including the four pre-charge control signal lines 113 that are in the first sequence, the third sequence, the fifth sequence, and the seventh sequence, and a second group including the four pre-charge control signal lines 113 that are in the second sequence, the fourth sequence, the sixth series, and the eighth sequence. Note that a method of dividing a plurality of the pre-charge control signal lines 113 is not limited to the dividing the pre-charge control signal lines 113 into the group of the pre-charge control signal lines 113 in the odd-numbered sequences, and the group of the pre-charge control signal lines 113 in the even-numbered sequences. For example, the eight pre-charge control signal lines 113 may be divided into a group including the four pre-charge control signal lines 113 that are in the first sequence, the second sequence, the third sequence, and the fourth sequence, and a group including the four pre-charge control signal lines 113 that are in the fifth sequence, the sixth sequence, the seventh sequence, and the eighth sequence.

Part of the wiring of the first group of pre-charge control signal lines 113 is disposed on a side in the first direction D1 with respect to the pre-charge selection circuit 152. That is, the part of the wiring of the first group of pre-charge control signal lines 113 is disposed on the side in the first direction D1 with respect to the pre-charge switch 152a. Note that part of wiring of the pre-charge control signal line 113 is part of the wiring of the pre-charge control signal line 113 in the electro-optical panel 100 that extends in the second direction D2.

The switch driving circuit 154 is disposed on the side in the first direction D1 with respect to the part of the wiring of the first group of pre-charge control signal lines 113. In other words, the AND circuit 154a that functions as a signal selection circuit is disposed on the side in the first direction D1 with respect to the part of the wiring of the first group of pre-charge control signal lines 113.

Additionally, part of wiring of the second group of pre-charge control signal lines 113 is disposed on the side in the first direction D1 with respect to the switch driving circuit 154. That is, the part of the wiring of the second group of pre-charge control signal lines 113 is disposed on the side in the first direction D1 with respect to the AND circuit 154a. The inspection circuit 160 is disposed on the side in the first direction D1 with respect to the part of the wiring of the second group of pre-charge control signal lines 113.

As illustrated in FIG. 10, the switch driving circuit 154 is disposed between part of the wiring of the first group of pre-charge control signal lines 113 that extends in the second direction D2, and part of the wiring of the second group of pre-charge control signal lines 113 that extends in the second direction D2. Thus, a layout for inputting the pre-charge control signal PSL from two directions to the switch driving circuit 154 is enabled. As a result, a length of a branch line 113a from the part of the wiring of the pre-charge control signal line 113 extending in the second direction D2 to a gate electrode that is an input terminal of the first NAND circuit 154b, can be shortened compared to the configuration in FIG. 4. In FIG. 10, of the wiring of the pre-charge control signal line 113, part corresponding to the branch 113a is illustrated as a thick line. In the pre-charge circuit 150A, since the length of the branch line 113a of the pre-charge control signal line 113 can be shortened, parasitic capacitance that serves as a drive load of the pre-charge control signal line 113 can be reduced, and it is possible to drive the pre-charge switch 152a at high speed.

In addition, wiring from the inspection circuit 160 to the switch driving circuit 154 branches into eight lines before intersecting with the wiring of the second group of pre-charge control signal lines 113. As a result, in the pre-charge circuit 150A, the number of intersections between wiring from the inspection circuit 160 to the switch driving circuit 154 and the wiring of the second group of pre-charge control signal lines 113, and the number of intersections between wiring from the output terminal of the first inverter 154c to a contact of the pre-charge switch 152a and the wiring of the first group of pre-charge control signal lines 113 are mutually identical. According to this configuration, respective drive loads of the first group of pre-charge control signal lines 113 and the second group of pre-charge control signal lines 113 are approximately identical, thus a difference in delay between the signal lines 111 of a pre-charge operation with respect to each of pixel rows when viewed in units of the switch driving circuit 154 can be suppressed, and occurrence of display failures can be suppressed.

Specifically, when it is desired to perform pre-charge to the signal line 111 in the first sequence at time T1 in a certain horizontal scanning period H, the pre-charge to the signal line 111 in the first sequence that is controlled at an end portion of the pre-charge control signal line 113 in the first sequence to which the pre-charge control signal PSL[1] is supplied is performed at time T1+δT1. Here, δT1 is delay time caused by the drive load and wiring resistance of the pre-charge control signal line 113 in the first sequence. Similarly, when it is desired to perform pre-charge to the signal line 111 in the second sequence at time T2, the pre-charge to the signal line 111 in the second sequence that is controlled at an end portion of the pre-charge control signal line 113 in the second sequence to which the pre-charge control signal PSL[2] is supplied is performed at time T2+δT2. Here, δT2 is delay time caused by the drive load and wiring resistance of the pre-charge control signal line 113 in the second sequence. When the respective drive loads of the pre-charge control signal lines 113 are made closer, it is possible to set δT1=δT2, and thus the occurrence of display failures can be suppressed.

Furthermore, considering the wiring of the pre-charge control signal line 113 in the second sequence in the second group of pre-charge control signal lines 113, the switch driving circuit 154 is adjacent to one side and the pre-charge control signal line 113 in the fourth sequence is adjacent to the other side. Similarly, considering the wiring of the pre-charge control signal line 113 in the first sequence in the first group of pre-charge control signal lines 113, the switch driving circuit 154 is adjacent to one side and the pre-charge control signal line 113 in the third sequence is adjacent to the other side. Since a first parasitic capacitance relationships between the pre-charge control signal line 113 in the first sequence and another node and a second parasitic capacitance relationship between the pre-charge control signal line 113 in the second sequence and another node are made close to each other, the pre-charge control signal line 113 in the first sequence and the pre-charge control signal line 113 in the second sequence controlling a pre-charge operation to the two adjacent signal lines 111 have drive loads that are close to each other. Similarly, the respective pre-charge control signal lines 113 in the third sequence and the fourth sequence have drive loads that are close to each other, the respective pre-charge control signal lines 113 in the fifth sequence and the six sequence have drive loads that are close to each other, and the respective pre-charge control signal lines 113 in the seventh sequence and the eighth sequence have drive loads that are close to each other. This configuration is also effective in suppressing the occurrence of display failures.

Here, the drive load of the pre-charge control signal line 113 will be described by comparing the configuration in FIG. 4 and the configuration in FIG. 10. For example, a case is considered in which the branch line 113a of the pre-charge control signal line 113 is a gate electrode layer, and part of the wiring of the pre-charge control signal line 113 extending in the second direction D2 is a first metal layer wiring layer, and part of the wiring from the inspection circuit 160 to the switch driving circuit 154 overlapping the pre-charge control signal line 113 is a second metal layer wiring layer.

For example, assume that cross wiring capacitance due to an insulating layer interposed between the gate electrode layer and the first metal layer wiring layer is 1 A, and cross wiring capacitance due to an insulating layer interposed between the first metal layer wiring layer and the second metal layer wiring layer is 0.4 A. Note that, here, A is a unit configured for convenience to represent a ratio of two capacitances, and does not denote a unique numerical value. In this case, in the pre-charge control signal line 113 in the eighth sequence in the configuration in FIG. 4, a total cross wiring capacitance per one switch driving circuit 154 is a sum of 1 A×7 locations and 0.4 A×1 location, and is equal to 7.4 A. Compared to this, in the pre-charge control signal line 113 in the second sequence in the configuration in FIG. 10, a total cross wiring capacitance per one switch driving circuit 154 is a sum of 1 A×3 locations and 0.4 A×8 locations, and is equal to 6.2 A. Thus, in the configuration in FIG. 10, the cross wiring capacitance can be reduced as compared to that in the configuration in FIG. 4.

Further, in the configuration in FIG. 10, an interval between the branches 113a adjacent to each other is approximately twice as much as that in the configuration in FIG. 4. Thus, in the configuration in FIG. 10, as compared to the configuration in FIG. 4, parallel wiring capacitance between the branch lines 113a can also be reduced. In the configuration in FIG. 10, as compared to the configuration in FIG. 4, the cross wiring capacitance and the parallel wiring capacitance between the pre-charge control signal lines 113a and the like can be reduced, and as a result, the drive load of the pre-charge control signal line 113 can be reduced.

An operation timing in the normal operation of the electro-optical device 1 is, for example, identical to the operation timing in FIG. 5. Further, in an inspection operation for inspecting a state of the signal line 111, a signal may be supplied to the electro-optical panel 100 at an identical timing to a signal timing in FIG. 6, or a signal may be supplied to the electro-optical panel 100 at a timing different from the signal timing in FIG. 6. Next, with reference to FIG. 11 and FIG. 12, an example will be described in which a signal is supplied to the electro-optical panel 100 at the identical timing to the signal timing in FIG. 6 to inspect a state of the signal line 111.

Figure 11:
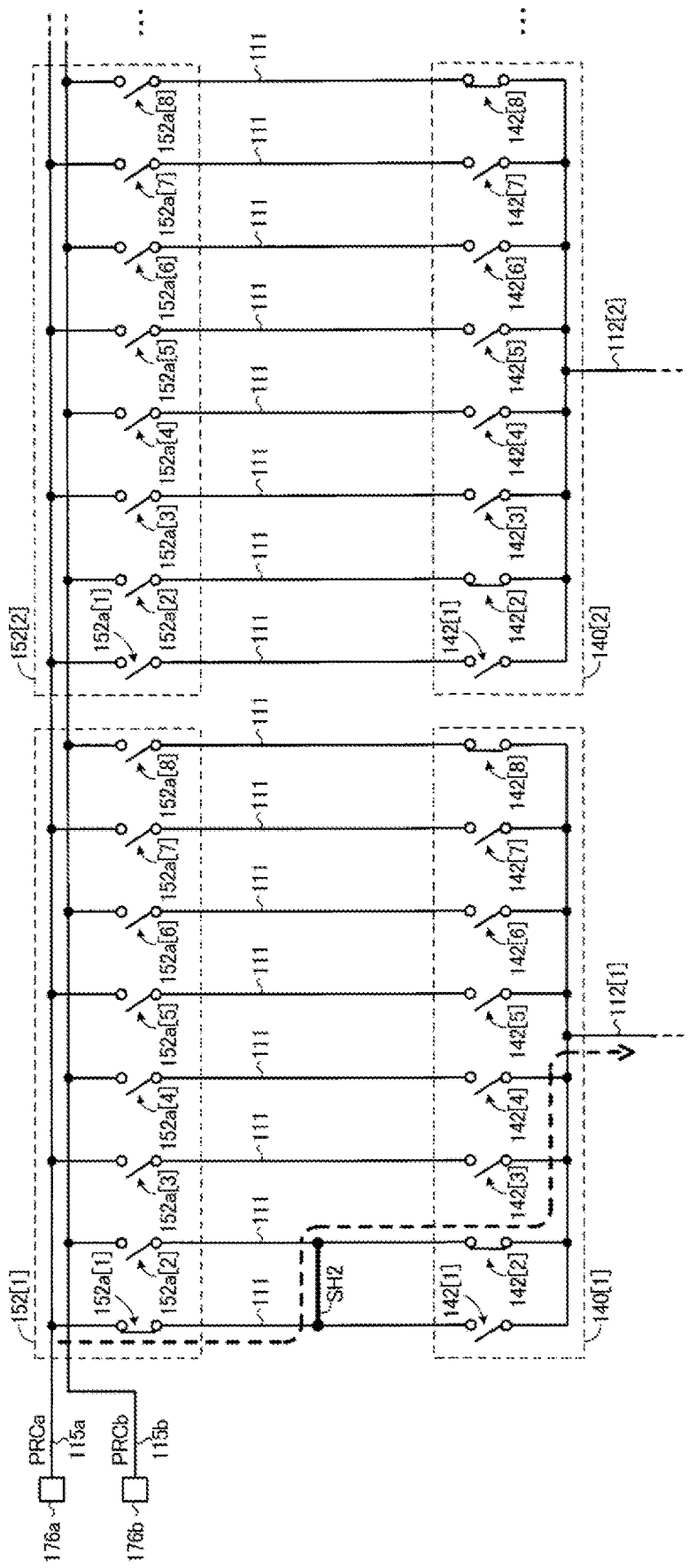
FIG. 11 is an explanatory diagram of an example of a short-circuit inspection for inspecting a short-circuit of signal lines adjacent to each other.

FIG. 11 is an explanatory diagram of an example of a short-circuit inspection for inspecting a short-circuit of the signal lines 111 adjacent to each other. In the short-cut inspection illustrated in FIG. 11, the inspection mode signal TX, the first clock signal CLK, the second clock signal CLKB, the start pulse DX, and the pre-charge control signals PSL[1] to PSL[8] are supplied to the electro-optical panel 100, similar to the short-circuit inspection in FIG. 7. For example, in a period in which the pre-charge switch 152a[1] is set to the conductive state, the writing switch 142[2] coupled to the signal line 111 in the second sequence, and the writing switch 142[8] coupled to the signal line 111 in the eighth sequence that are adjacent to the signal line 111 in the first sequence are set to the conductive state by the write selection signals SL[2] and SL[8], respectively.

For example, when the short-circuit part SH2 exists between the signal line 111 in the first sequence and the signal line 111 in the second sequence of the signal line group corresponding to the demultiplexer 140[1], a current flows by applying a potential difference between the sixth inspection pad 176a and an inspection pad (not illustrated) of the data line 112[1]. Thus, a short-circuit between the signal line 111 in the first sequence and the signal line 111 in the second sequence of the signal line group corresponding to the demultiplexer 140[1] can be detected. Next, a disconnection inspection for inspecting a disconnection of the signal line 111 will be described with reference to FIG. 12.

Figure 12:
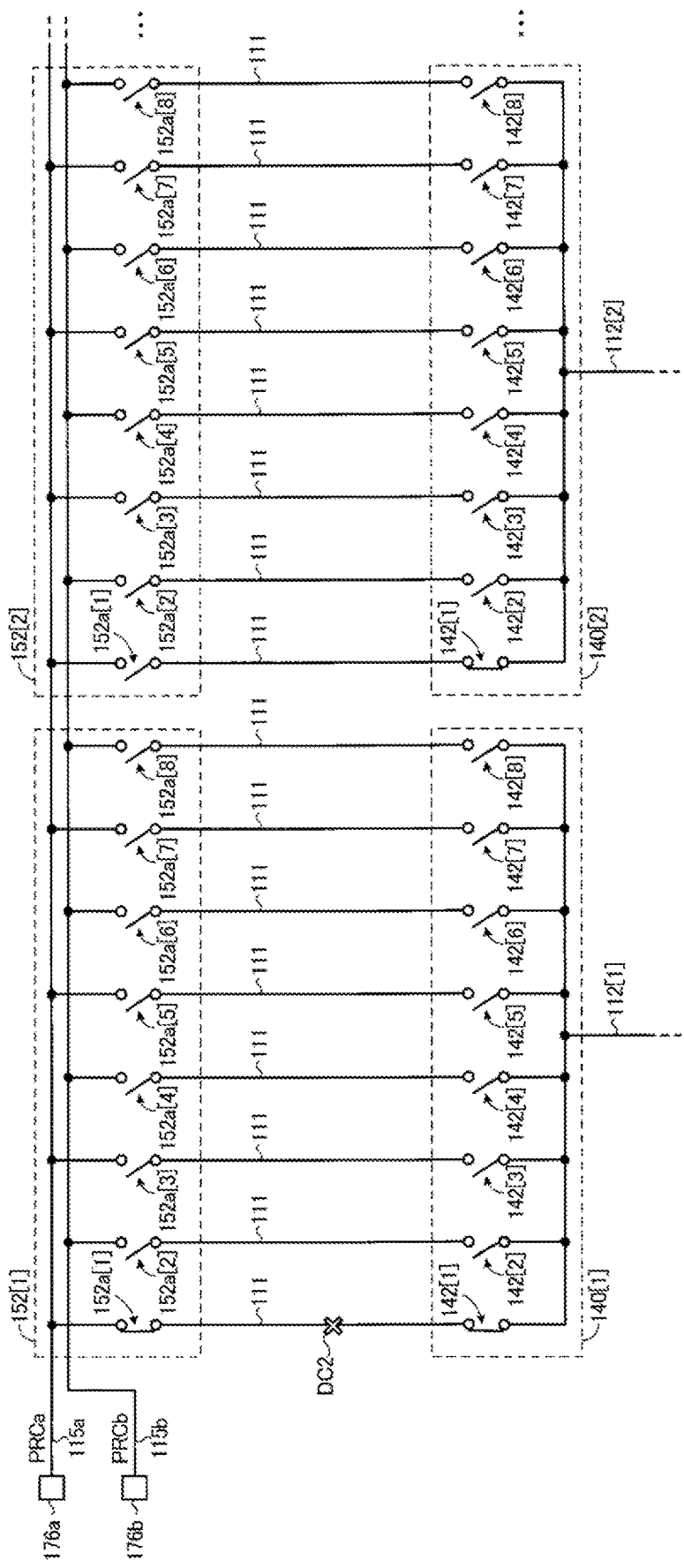
FIG. 12 is an explanatory diagram of an example of a disconnection inspection for inspecting a disconnection of a signal line.

FIG. 12 is an explanatory diagram of an example of the disconnection inspection for inspecting a disconnection of the signal line 111. In the disconnection inspection illustrated in FIG. 12, the inspection mode signal TX, the first clock signal CLK, the second clock signal CLKB, the start pulse DX, and the pre-charge control signals PSL[1] to PSL[8] are supplied to the electro-optical panel 100, similar to the disconnection inspection in FIG. 8. For example, in a period in which the pre-charge switch 152a[1] is set to the conductive state, the writing switch 142[1] coupled to the signal line 111 in the first sequence is set to the conductive state by the write selection signal SL[1]. A cross mark in FIG. 12 denotes a disconnection of the line.

For example, when the disconnection portion DC2 exists in the signal line 111 in the first sequence in the signal line group corresponding to the demultiplexer 140[1], a current does not flow even when a potential difference is applied between the sixth inspection pad 176a and an inspection pad (not illustrated) of the data line 112[1]. Compared to this, when the signal line 111 is not disconnected, for example, a current flows by applying a potential difference between the sixth inspection pad 176a and an inspection pad (not illustrated) of the data line 112[1]. In other words, a disconnection of the signal line 111 can be detected by applying a potential difference between one of the sixth inspection pads 176a and 176b and the data line 112. Next, with reference to FIGS. 13 to 15, an example will be described in which a signal is supplied to the electro-optical panel 100 at a different timing from the signal timing in FIG. 6 to inspect a state of the signal line 111.

Figure 13:
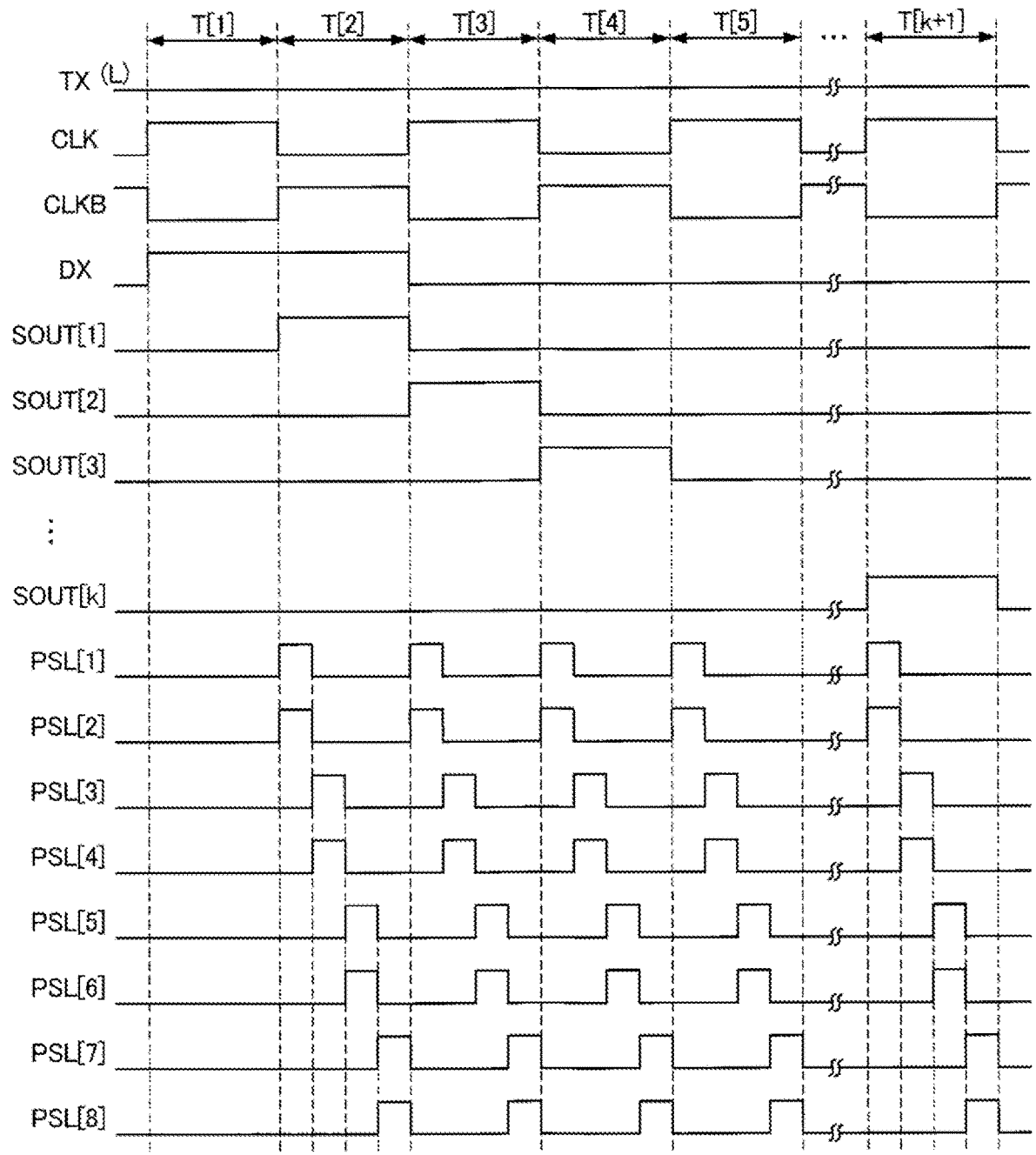
FIG. 13 is a diagram illustrating an example of a signal supplied to an electro-optical panel in inspecting a state of a signal line.

FIG. 13 is a diagram illustrating an example of a signal supplied to the electro-optical panel 100 in inspecting a state of the signal line 111. In an inspection operation for inspecting a status of the signal line 111, the first clock signal CLK is supplied to the second inspection pad 172, the second clock signal CLKB is supplied to the third inspection pad 173, and the low level inspection mode signal TX is supplied to the fifth inspection pad 175. In this case, the inspection mode control switch 162f is set to the non-conductive state.

In the inspection operation, the start pulse DX whose high level period is one period of the first clock signal CLK is supplied to the fourth inspection pad 174. In this case, the inspection control signals SOUT[1] to SOUT[k] each of which the high level period is 0.5 periods of the first clock signal CLK are sequentially outputted in synchronization with rising of the first clock signal CLK and rising of the second clock signal CLKB.

Note that the pre-charge control signals PSL[1] to PSL[8] that set each pair of the pre-charge switches 152a to the conductive state in order in the period T in which the inspection control signal SOUT is at the high level, are supplied to the respective inspection pads that are in the respective pre-charge control signal lines 113 in each sequence. In the example illustrated in FIG. 11, pairs of the pre-charge switches 152a include a pair of the pre-charge switches 152a[1] and 152a[2], a pair of the pre-charge switches 152a[3] and 152a[4], a pair of the pre-charge switches 152a[5] and 152a[6], and a pair of the pre-charge switches 152a[7] and 152a[8].

For example, in the period T[2], only the inspection control signal SOUT[1] of the inspection control signals SOUT[1] to SOUT[k] is at the high level, so the pairs of the pre-charge switches 152a of the pre-charge selection circuit 152[1] are set to the conductive state in order. In other words, in the period T[2], a pair of the respective signal lines 111 in the first row and the second row, a pair of the respective signal lines 111 in the third row and the fourth row, a pair of the respective signal lines 111 in the fifth row and the sixth row, and a pair of the respective signal lines 111 in the seventh row and the eighth row are sequentially coupled to the pre-charge power supply line 115.

For example, in a period T[k+1], only the inspection control signal SOUT[k] of the inspection control signals SOUT[1] to SOUT[k] is at the high level, so the pairs of the pre-charge switches 152a of the pre-charge selection circuit 152[k] are set to the conductive state in order. In other words, in the period T[k+1], a pair of the respective signal lines 111 in an n−7-th row and an n−6-th row, a pair of the respective signal lines 111 in an n−5-th row and an n−4-th row, a pair of the respective signal lines 111 in an n−3-th row and an n−2-th row, and a pair of the respective signal lines 111 in an n−1-th row and an n-th row are sequentially coupled to the pre-charge power supply line 115. Next, a short-cut inspection for inspecting a short-circuit of the signal lines 111 adjacent to each other will be described with reference to FIG. 14.

Figure 14:
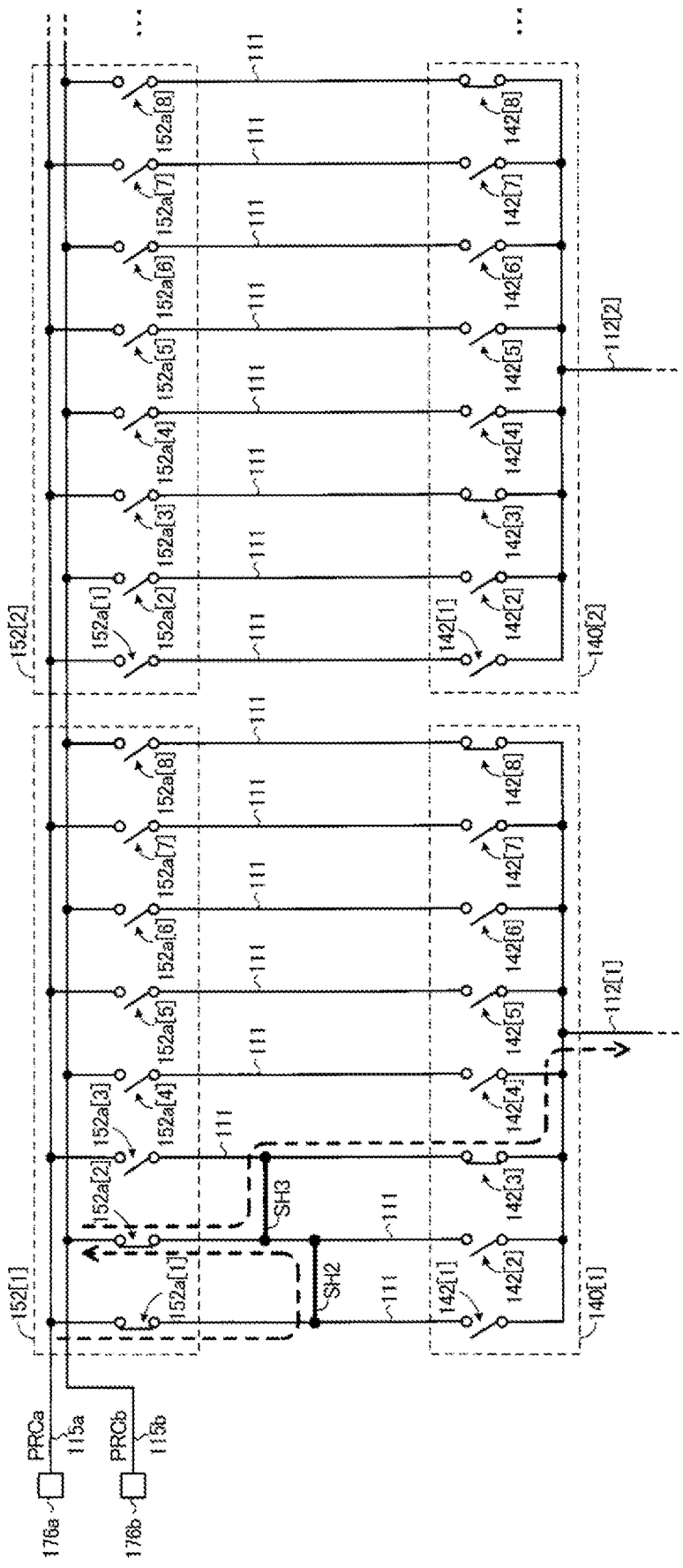
FIG. 14 is an explanatory diagram of an example of a short-circuit inspection for inspecting a short-circuit of signal lines adjacent to each other.

FIG. 14 is an explanatory diagram of an example of the short-circuit inspection for inspecting a short-circuit of the signal lines 111 adjacent to each other. In the short-circuit inspection illustrated in FIG. 14, the inspection mode signal TX, the first clock signal CLK, the second clock signal CLKB, the start pulse DX, and the pre-charge control signals PSL[1] to PSL[8] are supplied to the electro-optical panel 100 at the signal timing in FIG. 13.

For example, in a period in which the pre-charge switch 152a[1] and 152a[2] are set to the conductive state, the writing switches 142[3] and 142[8] coupled to the signal lines 111 in the third sequence and the eighth sequence adjacent to the pair of the respective signal lines 111 in the first sequence and the second sequence are set to the conductive state by the write selection signals SL[3] and SL[8], respectively.

For example, when the short-circuit part SH2 exists between the signal line 111 in the first sequence and the signal line 111 in the second sequence of the signal line group corresponding to the demultiplexer 140[1], a current flows by applying a potential difference between the sixth inspection pads 176a and 176b. Thus, a short-circuit between the signal line 111 in the first sequence and the signal line 111 in the second sequence of the signal line group corresponding to the demultiplexer 140[1] can be detected.

For example, when a short-circuit part SH3 exists between the signal line 111 in the second sequence and the signal line 111 in the third sequence of the signal line group corresponding to the demultiplexer 140[1], a current flows by applying a potential difference between the sixth inspection pad 176b and an inspection pad (not illustrated) of the data line 112[1]. Thus, a short-circuit between the signal line 111 in the second sequence and the signal line 111 in the third sequence of the signal line group corresponding to the demultiplexer 140[1] can be detected. That is, by applying a potential difference among three inspection pads, that is, the sixth inspection pads 176a, 176b and an inspection pad (not illustrated) of the data line 112, a short-circuit of the signal lines 111 adjacent to each other can be inspected. Next, a disconnection inspection for inspecting a disconnection of the signal line 111 will be described with reference to FIG. 15.

Figure 15:
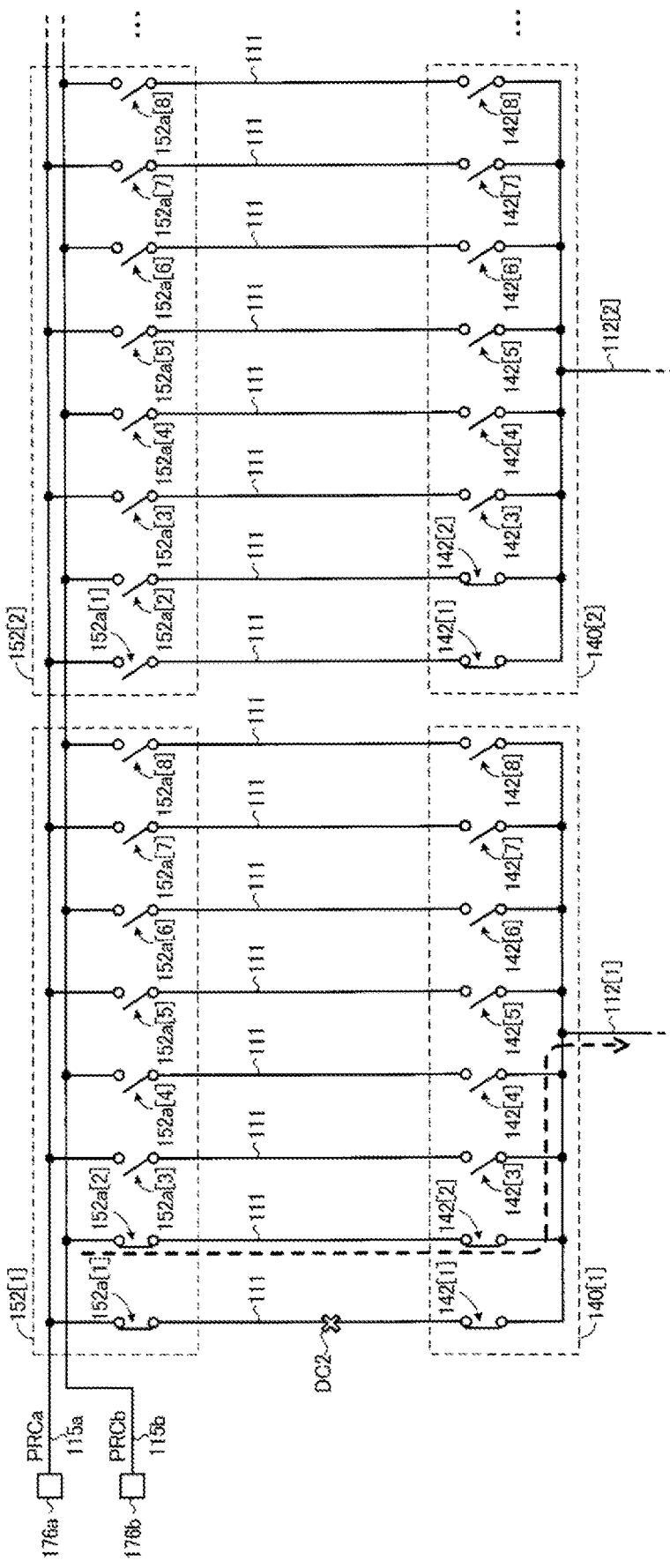
FIG. 15 is an explanatory diagram of an example of a disconnection inspection for inspecting a disconnection of a signal line.

FIG. 15 is an explanatory diagram of an example of the disconnection inspection for inspecting a disconnection of the signal line 111. In the disconnection inspection illustrated in FIG. 15, the inspection mode signal TX, the first clock signal CLK, the second clock signal CLKB, the start pulse DX, and the pre-charge control signals PSL[1] to PSL[8] are supplied to the electro-optical panel 100 at the signal timing in FIG. 13.

For example, in the period in which the pre-charge switch 152a[1] and 152a[2] are set to the conductive state, the writing switches 142[1] and 142[2] respectively coupled to the respective signal lines 111 that are in the first sequence and the second sequence, are set to the conductive state by the write selection signals SL[1] and SL[2], respectively. A cross mark in FIG. 15 denotes a disconnection of the line.

For example, when the disconnection portion DC2 exists in the signal line 111 in the first sequence in the signal line group corresponding to the demultiplexer 140[1], a current does not flow even when a potential difference is applied between the sixth inspection pad 176a and an inspection pad (not illustrated) of the data line 112[1]. Compared to this, when the signal line 111 is not disconnected, for example, a current flows by applying a potential difference between the sixth inspection pad 176a and an inspection pad (not illustrated) of the data line 112[1]. In other words, a disconnection of the signal line 111 can be detected by applying a potential difference between the sixth inspection pad 176a and the data line 112.

Additionally, in the example illustrated in FIG. 15, since the signal line 111 in the second sequence in the signal line group corresponding to the demultiplexer 140[1] is not disconnected, a current flows when a potential difference is applied between the sixth inspection pad 176b and an inspection pad (not illustrated) of the data line 112[1]. Note that, when the signal line 111 in the second sequence of the signal line group corresponding to the demultiplexer 140[1] is disconnected, a current does not flow even when a potential difference is applied between the sixth inspection pad 176 and an inspection pad, not illustrated, of the data line 112[1]. In other words, a disconnection of the signal line 111 can be detected by applying a potential difference between the sixth inspection pad 176b and the data line 112. Next, a short-circuit inspection for inspecting presence or absence of a short-circuit of the signal lines 111 adjacent to each other will be described with reference to FIG. 16.

Figure 16:
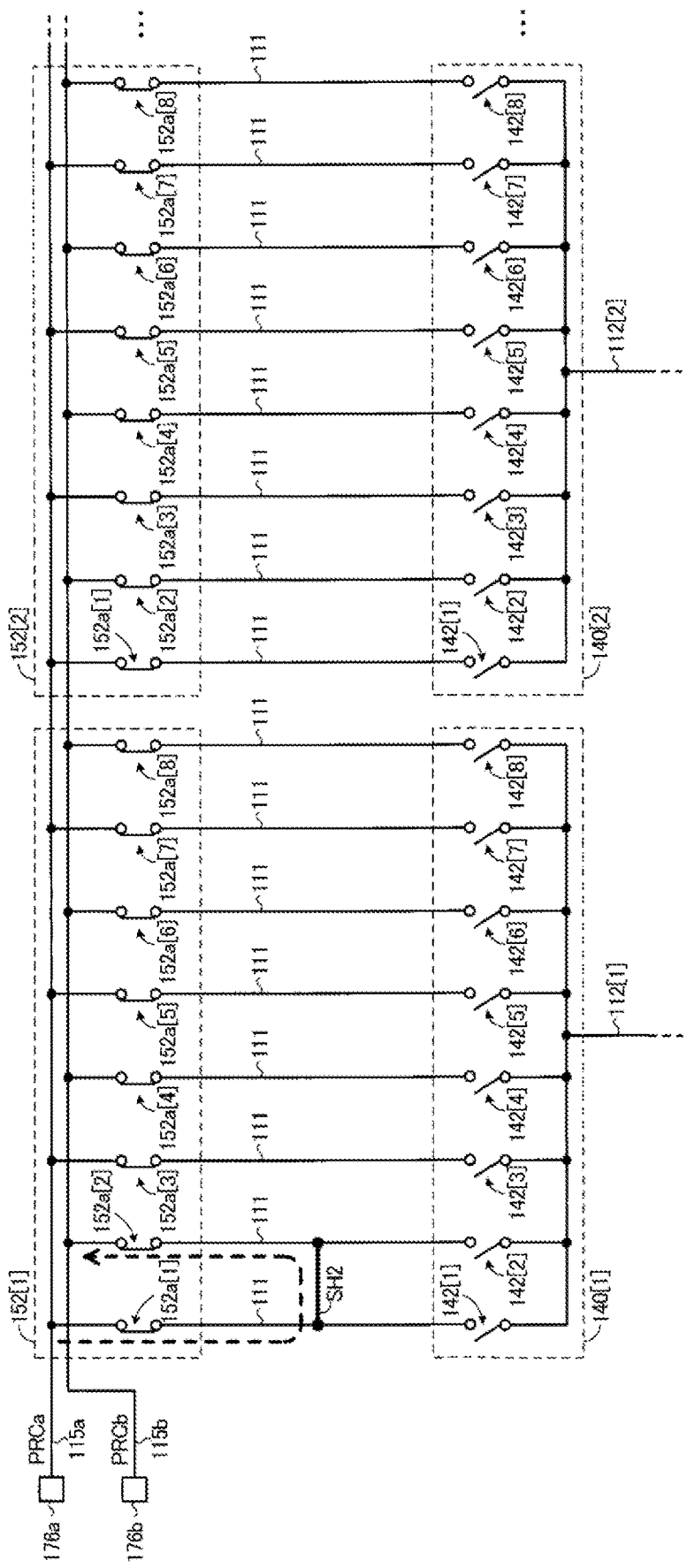
FIG. 16 is an explanatory diagram of an example of a short-circuit inspection for inspecting presence or absence of a short-circuit of signal lines adjacent to each other.

FIG. 16 is an explanatory diagram of an example of the short-circuit inspection for inspecting presence or absence of a short-circuit of the signal lines 111 adjacent to each other. In the short-circuit inspection illustrated in FIG. 16, for example, the first inspection pad 171, the second inspection pad 172, the third inspection pad 173, the fourth inspection pad 174, and the fifth inspection pad 175 are set to high impedance. In this case, the inspection mode signal TX is maintained at the high level by the pull-up resistor 164, and thus the inspection control signals SOUT[1] to SOUT[k] are maintained at the high level. Note that a high level voltage is applied to the inspection pad of the pre-charge control signal line 113 in each sequence.

In other words, in the short-circuit inspection illustrated in FIG. 16, all of the inspection control signals SOUT[1] to SOUT[k] are forcibly set to the high level, and all of the pre-charge control signals PSL[1] to PSL[8] are set to the high level, to set all of the pre-charge switches 152a to the conductive state.

When the short-circuit part SH2 or the like exists between the signal lines 111 adjacent to each other, a current flows by applying a potential difference between the sixth inspection pads 176a and 176b, so presence or absence of the short-circuit part SH2 between the adjacent signal lines 111 can be detected.

Note that, in the short-circuit inspection illustrated in FIG. 16, the inspection mode signal TX, the first clock signal CLK, and the second clock signal CLKB may be supplied to the electro-optical panel 100, and the start pulse DX may be maintained at the high level, similar to the short-cut inspection in FIG. 7. In this case as well, all of the inspection control signals SOUT[1] to SOUT[k] are maintained at the high level.

As described above, also in Second Exemplary Embodiment, effects similar to the effects of First Exemplary Embodiment can be achieved. Further, in Second Exemplary Embodiment, the plurality of pre-charge control signal lines 113 is divided into the first group of pre-charge control signal lines 113 and the second group of pre-charge control signal lines 113. Then, the switch driving circuit 154 is disposed between the part of the wiring of the first group of pre-charge control signal lines 113 extending in the second direction D2 and the part of the wiring of the second group of pre-charge control signal lines 113 extending in the second direction D2.

Thus, in Second Exemplary Embodiment, the layout for inputting the pre-charge control signal PSL from two directions to the switch driving circuit 154 is enabled. As a result, the length of the branch line 113a from the part of the wiring of the pre-charge control signal line 113 extending in the second direction D2 to the gate electrode that is the input terminal of the first NAND circuit 154b can be shortened as compared to the configuration in FIG. 4. Since the length of the branch 113a of the pre-charge control signal line 113 can be shortened, parasitic capacitance that serves as a drive load of the pre-charge control signal line 113 can be reduced, and it is possible to drive the pre-charge switch 152a at high speed.

Third Exemplary Embodiment

A main difference between Third Exemplary Embodiment and Second Exemplary Embodiment is a manner in which the AND circuit 154a is disposed.

Figure 17:
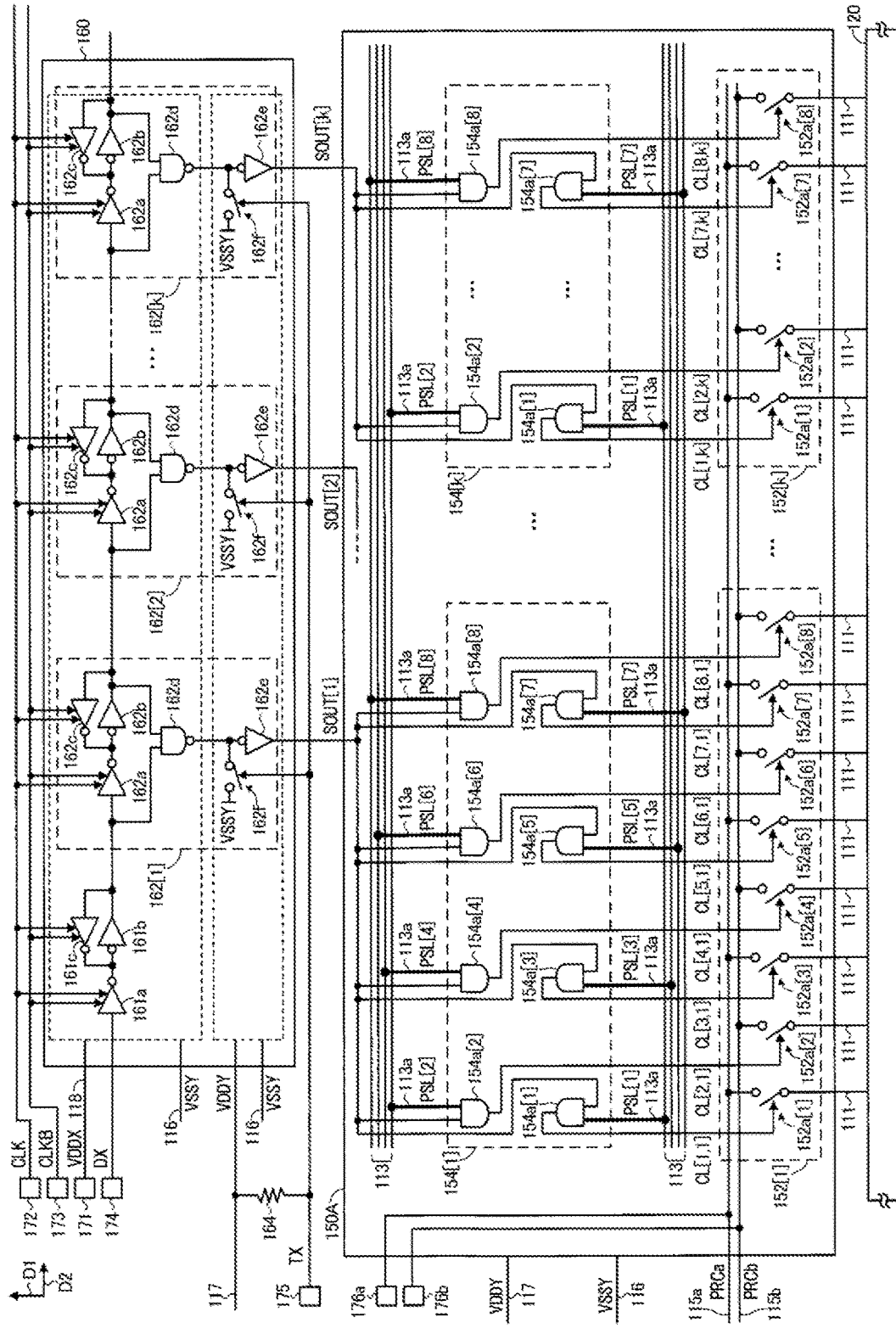
FIG. 17 is a circuit diagram illustrating a configuration of a pre-charge circuit and an inspection circuit of an electro-optical device according to Third Exemplary Embodiment.

FIG. 17 is a circuit diagram illustrating a configuration of the pre-charge circuit 150A and the inspection circuit 160 of the electro-optical device 1 according to Third Exemplary Embodiment. Elements that are identical to those described in FIGS. 1 to 16 are given identical reference signs, and detailed descriptions will be omitted. The electro-optical device 1 according to Third Exemplary Embodiment is identical to the electro-optical device 1 according to Second Exemplary Embodiment, except for the manner in which the AND circuit 154a is disposed in the pre-charge circuit 150A. Accordingly, disposition of the AND circuit 154a in the pre-charge circuit 150A will be illustrated in FIG. 17. Note that, in FIG. 17, the first NAND circuit 154b and the first inverter 154c included in the AND circuit 154a are omitted for ease of illustration, but the AND circuit 154a illustrated in FIG. 17 is identical to the AND circuit 154a in FIG. 10.

The AND circuit 154a is disposed between part of wiring of the first group of pre-charge control signal lines 113 extending in the second direction D2, and part of wiring of the second group of pre-charge control signal lines 113 extending in the second direction D2. Furthermore, the AND circuit 154a coupled to the second group of pre-charge control signal lines 113 is disposed on the side in the first direction D1 with respect to the AND circuit 154a coupled to the first group of pre-charge control signal lines 113. In the example illustrated in FIG. 17, the AND circuit 154a[2] is disposed on the side in the first direction D1 with respect to the AND circuit 154a[1], and the AND circuit 154a[4] is disposed on the side in the first direction D1 with respect to the AND circuit 154a[3]. Further, the AND circuit 154a[6] is disposed on the side in the first direction D1 with respect to the AND circuit 154a[5], and the AND circuit 154a[8] is disposed on the side in the first direction D1 with respect to the AND circuit 154a[7].

In the configuration in FIG. 17, two AND circuits 154a are disposed along the first direction D1, so that the AND circuit 154a can be disposed at a two-pixel pitch along the second direction D2. For example, the AND circuits 154a[1], 154a[3], 154a[5], and 154a[7] can be disposed at a two-pixel pitch. Thus, in the configuration in FIG. 10, when a disposal pitch of the AND circuits 154a, in a case in which the signal lines 111 and the like are disposed at narrow pitches, is a bottleneck, by adopting the configuration in FIG. 17, as compared to the configuration in FIG. 10, the signal lines 111 can be disposed at a narrower pitch.

As described above, also in Third Exemplary Embodiment, effects similar to the effects of Second Exemplary Embodiment can be achieved. Furthermore, in Third Exemplary Embodiment, the AND circuit 154a coupled to the second group of pre-charge control signal lines 113 is disposed on the side in the first direction D1 with respect to the AND circuit 154a coupled to the first group of the pre-charge control signal lines 113. As a result, the AND circuits 154a can be disposed at a two-pixel pitch along the second direction D2, and the signal lines 111 and the like can be disposed at narrow pitches. Accordingly, the electro-optical device 1 of Third Exemplary Embodiment can be applied to a high definition panel.

Figure 18:
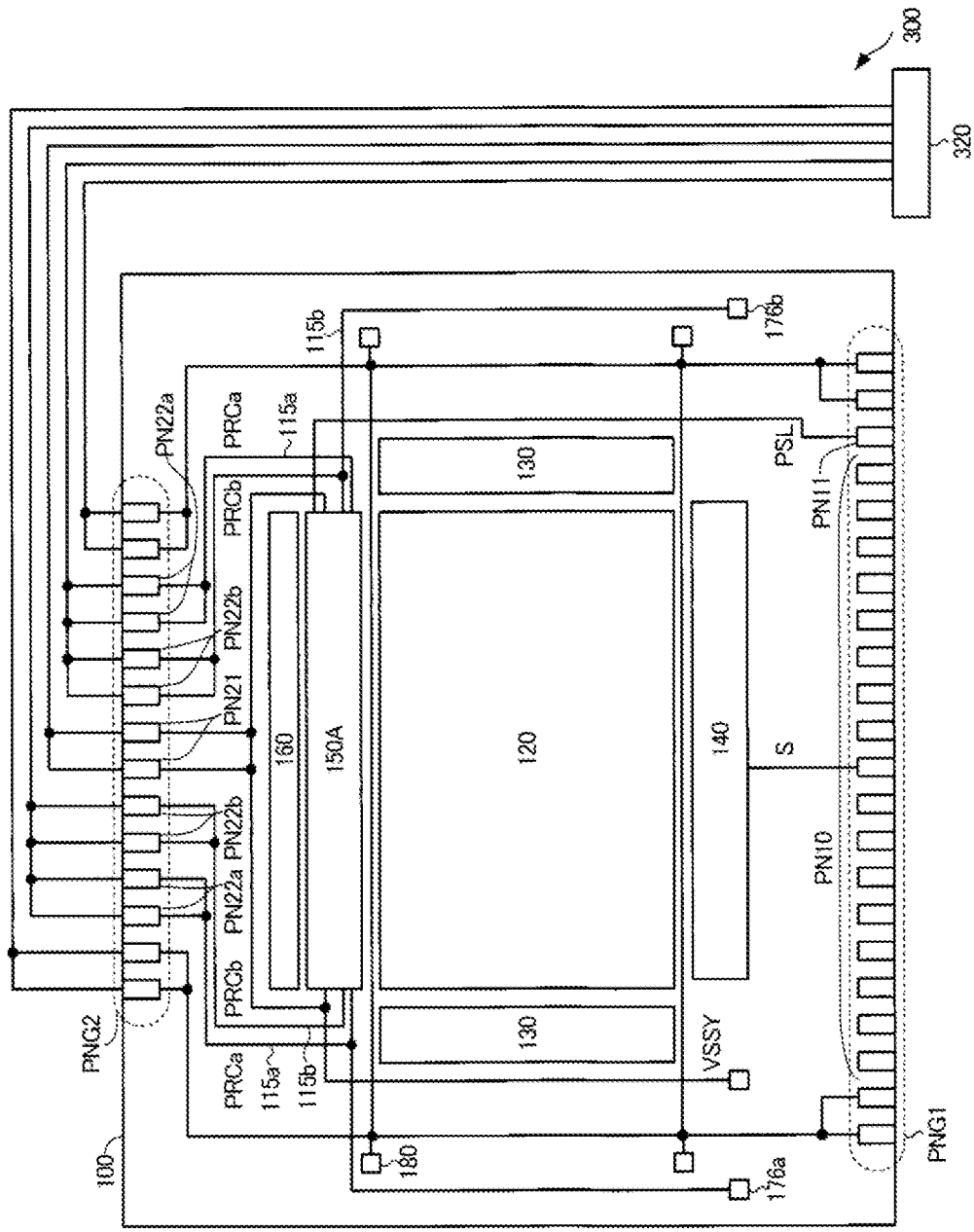
FIG. 18 is a diagram illustrating an example of a terminal arrangement of an electro-optical panel.

FIG. 18 is a diagram illustrating an example of a terminal arrangement of the electro-optical panel 100. Note that FIG. 18 illustrates an example of a terminal arrangement of the electro-optical panel 100 of Second Exemplary Embodiment and Third Exemplary Embodiment. A terminal arrangement of the electro-optical panel 100 of First Exemplary Embodiment can be described by using FIG. 18, by replacing the pre-charge circuit 150A, the pre-charge power supply lines 115a and 115b, and the pre-charge signals PRCa and PRCb with the pre-charge circuit 150, the pre-charge power supply line 115, and the pre-charge signal PRC, respectively.

An image signal terminal PN10 is a terminal that receives the image signal S from the signal line driving circuit 210. A pre-charge control signal terminal PN11 is a terminal to which the pre-charge control signal line 113 is coupled. Note that, in FIG. 18, one of a plurality of the pre-charge control signal terminals PN11 is illustrated for ease of illustration. A reference sign 180 denotes a vertical conduction point. A first power supply terminal PN21 is a terminal to which the low potential side power supply line 116 of the switch driving circuit 154 is coupled. In addition, pre-charge power supply terminals PN22a and PN22b are terminals to which the pre-charge power supply lines 115a and 115b are coupled, respectively. Hereinafter, the pre-charge power supply terminals PN22a and PN22b are simply referred to as a pre-charge power supply terminal PN22, in a case in which it is not necessary to distinguish the pre-charge power supply terminals PN22a and PN22b, and the like.

In the example illustrated in FIG. 18, in the electro-optical panel 100, both the first power supply terminal PN21 and the pre-charge power supply terminal PN22 are disposed on a side opposite to a side on which the image signal terminal PN10 is disposed. In this case, since the pre-charge signal PRC or the like is supplied from a terminal disposed on a side close to the pre-charge circuit 150A, wiring resistance can be reduced as compared to a case where the first power supply terminal PN21 and the pre-charge power supply terminal PN22 are disposed on an identical side to the side on which the image signal terminal PN10 is disposed. As a result, power supply to the pre-charge circuit 150A can be enhanced.

Note that, in the electro-optical panel 100, both the first power supply terminal PN21 and the pre-charge power supply terminal PN22 may be disposed on a side different from the side on which the image signal terminal PN10 is disposed other than the side opposite to the side on which the image signal terminal PN10 is disposed. Further, one of the first power supply terminal PN21 and the pre-charge power supply terminal PN22 may be disposed on a side different from the side on which the image signal terminal PN10 is disposed.

In addition, in the electro-optical panel 100, the pre-charge control signal terminal PN11 is disposed on the identical side to the side on which the image signal terminal PN10 is disposed. In this case, a disposal pitch of the terminals such as the first power supply terminal PN21 and the pre-charge power supply terminal PN22 can be wider as compared to a case in which the pre-charge control signal terminal PN11 is disposed on an identical side to a side on which the first power supply terminal PN21 and the pre-charge power supply terminal PN22 are disposed. Furthermore, the signal terminals to be driven at high speed are aggregated on an identical side, and thus a configuration suitable for coupling to the drive integrated circuit 200 is achieved. A configuration in which various signals such as the pre-charge control signal PSL, the image signal S, and the write selection signal SL are outputted from an identical integrated circuit can be easily obtained, and thus it is possible to realize precisely synchronized driving between the signals. Note that the pre-charge control signal terminal PN11 may be disposed on a side different from the side on which the image signal terminal PN10 is disposed.

Furthermore, the flexible circuit board 300 is coupled to a second terminal group PNG2 including both the first power supply terminal PN21 and the pre-charge power supply terminal PN22. A connector portion 320 of the flexible circuit board 300 is coupled to the drive integrated circuit 200, for example. In FIG. 18, a description of the flexible circuit board 300 coupled to a first terminal group PNG1 including the image signal terminals PN10 is omitted. Note that, when one of the first power supply terminal PN21 and the pre-charge power supply terminal PN22 is disposed on a side different from the side on which the image signal terminal PN10 is disposed, the flexible circuit board 300 in FIG. 18 is coupled to a terminal group including one of the first power supply terminal PN21 and the pre-charge power supply terminal PN22.

Moreover, of a plurality of pieces of wiring of the flexible circuit board 300, a stabilizing capacitor may be provided between the piece of wiring coupled to the pre-charge power supply terminal PN22 and the piece of wiring coupled to the first power supply terminal PN21. Furthermore, of the plurality of pieces of wiring of the flexible circuit board 300, a stabilizing capacitor may be provided between the piece of wiring to which the common voltage Vcom is supplied and the piece of wiring coupled to the first power supply terminal PN21.

When a size of the pre-charge power supply terminal PN22 is a size that can be probed, respective inspection pads of pre-charge power supply lines 115a and 115b may be omitted. Similarly, when a size of the first power supply terminal PN21 is a size that can be probed, an inspection pad of the low potential side power supply line 116 may be omitted. Note that the terminal arrangement of the electro-optical panel 100 is not limited to that in the example illustrated in FIG. 18.

MODIFICATION EXAMPLES

Each of the forms in First Exemplary Embodiment to Third Exemplary Embodiment can be variously modified. Specific modification modes are exemplified below. Two or more modes freely selected from exemplifications below can be appropriately used in combination as long as mutual contradiction does not arise.

Modified Example 1

In each of the forms in First Exemplary Embodiment to Third Exemplary Embodiment, the n signal lines 111 may need not be classified into the k signal line groups.

Modified Example 2

In each of the forms in First Exemplary Embodiment to Third Exemplary Embodiment, the low potential side power supply of the AND circuit 154a may be separated from the low potential side power supply of the scanning line drive circuit 130. In this case, noise generated by driving the AND circuit 154a can be prevented from being superposed on the low potential side power supply of the scanning line drive circuit 130, and it is possible to reduce occurrence of a leakage current from the pixel 122 holding a potential based on the image signal S.

Modified Example 3

In each of the forms in First Exemplary Embodiment to Third Exemplary Embodiment, each switch driving circuit 154 may include an OR circuit instead of the AND circuit 154a. In this case, the fourth inverter 162e may be omitted, or an inverter may be added between the output terminal of the fourth inverter 162e and an input terminal of the OR circuit.

Fourth Modified Example

In each of the forms in First Exemplary Embodiment to Third Exemplary Embodiment, the electro-optical panel 100 may be a reflection-type electro-optical device. In addition, when the electro-optical panel 100 is a reflection-type, an LCOS (Liquid Crystal on Silicon) type using a semiconductor substrate for an element substrate on which the signal line 111 and the like are formed may be used.

Application Examples

Figure 19:
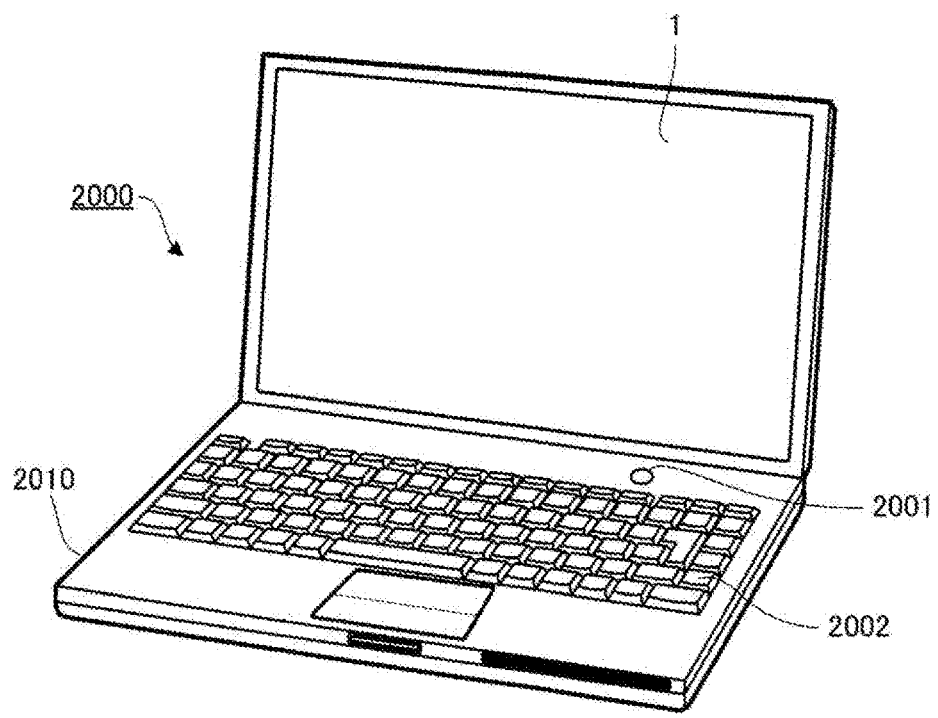
FIG. 19 is a perspective view illustrating a personal computer as an example of an electronic apparatus.
Figure 20:
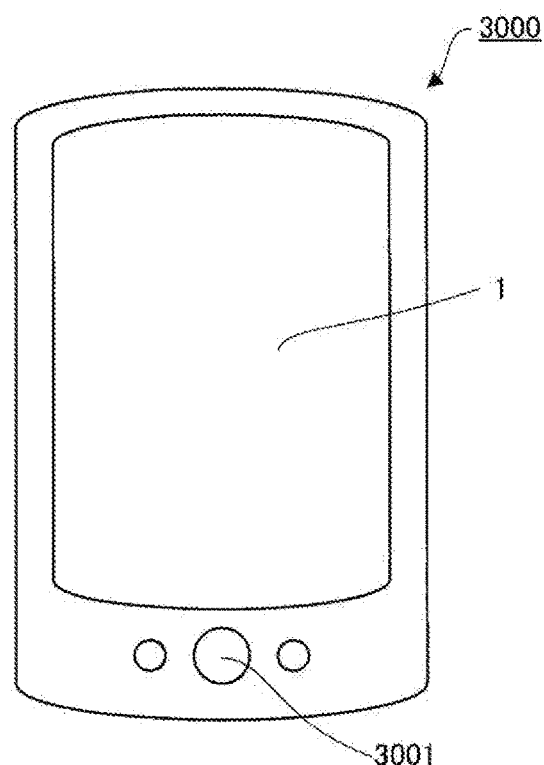
FIG. 20 is a front view illustrating a smart phone as an example of an electronic apparatus.
Figure 21:
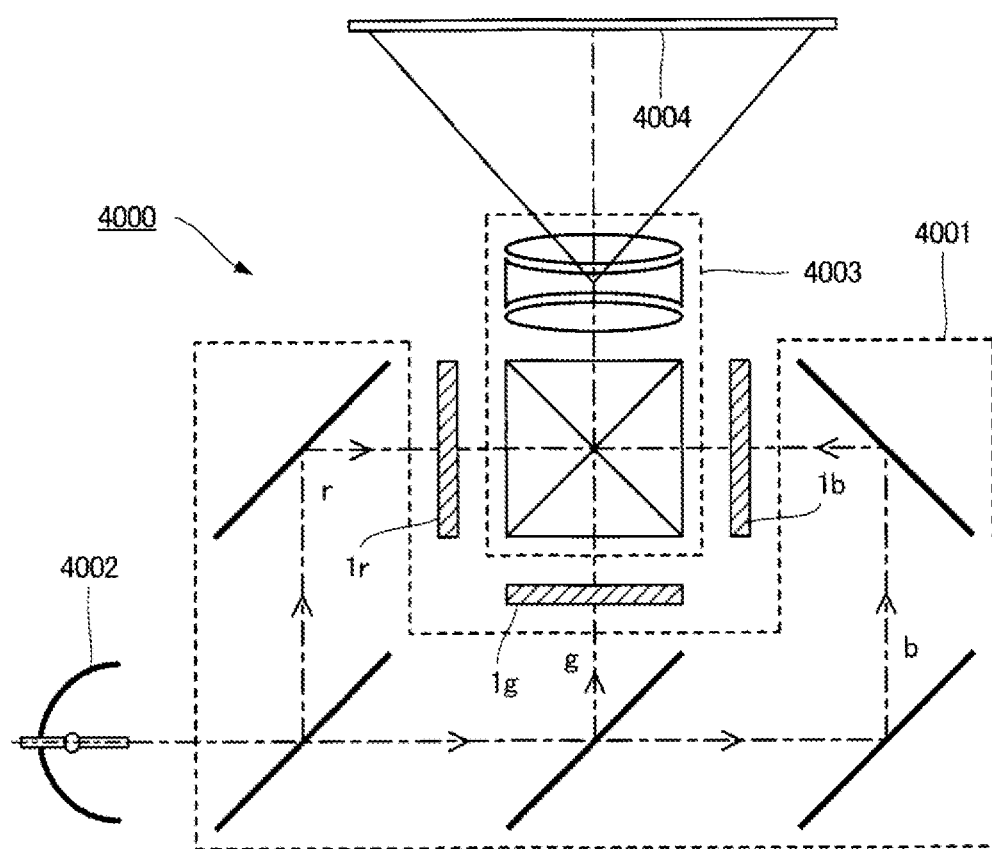
FIG. 21 is a schematic diagram illustrating a projection-type display apparatus as example of an electronic apparatus.

The present disclosure can be used in various electronic devices. FIGS. 19 to 21 exemplify respective specific forms of an electronic apparatus to which the present disclosure is applied.

FIG. 19 is a perspective view illustrating a personal computer 2000 as an example of the electronic apparatus. The personal computer 2000 includes the electro-optical device 1 for displaying various images, and a main body 2010 on which a power supply switch 2001 and a keyboard 2002 are installed.

FIG. 20 is a front view illustrating a smart phone 3000 as an example of the electronic apparatus. The smart phone 3000 includes an operation button 3001 and the electro-optical device 1 for displaying various images. Screen contents displayed on the electro-optical device 1 are changed in accordance with an operation of the operation button 3001.

FIG. 21 is a schematic diagram illustrating a projection-type display apparatus 4000 as an example of the electronic apparatus. The projection-type display device 4000 is a three-plate type projector, for example. An electro-optical device 1r illustrated in FIG. 21 is the electro-optical device 1 supporting a red display color, an electro-optical device 1g is the electro-optical device 1 supporting a green display color, and an electro-optical device 1b is the electro-optical device 1 supporting a blue display color.

That is, the projection-type display device 4000 includes the three electro-optical devices 1r, 1g, and 1b that respectively support the display colors of red, green, and blue. An illumination optical system 4001 supplies, of light emitted from an illumination device 4002 as a light source, a red element r to the electro-optical device 1r, a green element g to the electro-optical device 1g, and a blue element b to the electro-optical device 1b. Each of the electro-optical devices 1r, 1g, and 1b functions as an optical modulator, such as a light bulb, that modulates each ray of monochromatic light supplied from the illumination optical system 4001 depending on display images. A projection optical system 4003 combines rays of light emitted from the respective electro-optical devices 1r, 1g, and 1b to project the combined rays of light to a projection surface 4004.

Each of the above-described personal computer 2000, smart phone 3000, and projection-type display device 4000 includes the above-described electro-optical device 1, and thus image quality of a displayed image can be improved.

Note that, in addition to the apparatuses illustrated in FIG. 19, FIG. 20, and FIG. 21, electronic apparatuses to which the present disclosure is applied include, PDA (Personal Digital Assistants), a digital still camera, a television, a video camera, a car navigation device, an on-board indicator, an electronic organizer, an electronic paper, a calculator, a word processor, a workstation, a television phone, a POS (Point of sale) terminal, and the like. Further, electronic apparatuses to which the present disclosure is applied include devices including a printer, a scanner, a copier, a video player, or a touch panel, and the like.

The liquid crystal device and the electronic apparatus of the present disclosure are not limited to the exemplary embodiments described above. In addition, the configuration of each component of the present disclosure may be replaced with any configuration that exerts the equivalent functions of the above-described exemplary embodiments, and any configuration may be added.

What is claimed is:

1. An electro-optical device configured to supply an image signal to a first signal line and a second signal line in a display region of the electro-optical device, comprising:
an image signal circuit that is disposed on a first direction side with respect to the display region, the image signal circuit being configured to supply a first image signal to the first signal line based on a first write selection signal, and the image signal circuit being configured to supply a second image signal to the second signal line based on a second write selection signal;
a pre-charge circuit that is disposed on a second direction side opposite the first direction side with respect to the display region, the pre-charge circuit being configured to supply a first pre-charge signal to the first signal line based on a first pre-charge control signal, and the pre-charge circuit being configured to supply a second pre-charge signal to the second signal line based on a second pre-charge control signal; and an inspection circuit that is disposed on the second direction side with respect to the display region, the inspection circuit being configured to output an inspection control signal to the pre-charge circuit in an inspection operation for inspecting the first signal line and the second signal line, wherein the pre-charge circuit includes
  a first switch configured to switch an electrical coupling state between the first signal line and a pre-charge power supply line to which the pre-charge signal is supplied, based on a first coupling control signal,
  a second switch configured to switch an electrical coupling state between the second signal line and the pre-charge power supply line based on a second coupling control signal,
  a first signal selection circuit configured to output the first coupling control signal to the first switch based on the inspection control signal and the first pre-charge control signal, and
  a second signal selection circuit configured to output the second coupling control signal to the second switch based on the inspection control signal and the second pre-charge control signal.

2. The electro-optical device according to claim 1, comprising:
  a first pre-charge control signal line configured to supply the first pre-charge control signal to the first signal selection circuit; and
  a second pre-charge control signal line configured to supply the second pre-charge control signal to the second signal selection circuit, wherein
  the first signal selection circuit and the second signal selection circuit are disposed on the second direction side with respect to the first switch and the second switch,
  a part of wiring of the first pre-charge control signal line and a part of wiring of the second pre-charge control signal line are disposed on the second direction side with respect to the first signal selection circuit and the second signal selection circuit, and
  the inspection circuit is disposed on the second direction side with respect to a part of wiring of the first pre-charge control signal line and a part of wiring of the second pre-charge control signal line.

3. The electro-optical device according to claim 2, wherein
  the second signal selection circuit is disposed on the first direction side of the first signal selection circuit.

4. The electro-optical device according to claim 1, wherein
  the first signal selection circuit is configured to,
  in the inspection operation, when the inspection control signal indicates that the first signal line is to be inspected, output the pre-charge control signal to the first switch as the first coupling control signal, and when the inspection control signal indicates that the first signal line is not to be inspected, output the first coupling control signal for setting the first switch to a non-conductive state to the first switch, and
  in a normal operation for displaying an image in accordance with the image signal, when the pre-charge control signal indicates that the first signal line is to be pre-charged, output the first coupling control signal for setting the first switch to a conductive state to the first switch, and when the pre-charge control signal indicates that the first signal line is not to be pre-charged, output the first coupling control signal for setting the first switch to a non-conductive state to the first switch, and
  the second signal selection circuit is configured to,
  in the inspection operation, when the inspection control signal indicates that the second signal line is to be inspected, output the pre-charge control signal to the second switch as the second coupling control signal, and when the inspection control signal indicates that the second signal line is not to be inspected, output the second coupling control signal for setting the second switch to a non-conductive state to the second switch, and
  in the normal operation, when the pre-charge control signal indicates that the second signal line is to be pre-charged, output the second coupling control signal for setting the second switch to a conductive state to the second switch, and when the pre-charge control signal indicates that the second signal line is not to be pre-charged, output the second coupling control signal for setting the second switch to a non-conductive state to the second switch.

5. The electro-optical device according to claim 1, wherein
  the inspection circuit is configured to, in the inspection operation, when the first signal line is to be inspected, output the inspection control signal at a first logic level, of the first logic level and a second logic level, to the first signal selection circuit, and when the second signal line is to be inspected, output the inspection control signal at the first logic level to the second signal selection circuit, and in the normal operation, output the inspection control signal at the first logic level to the first signal selection circuit and the second signal selection circuit,
  the first signal selection circuit is configured to generate the first coupling control signal by a logical operation of the inspection control signal and the pre-charge control signal, and
  the second signal selection circuit is configured to generate the second coupling control signal by a logical operation of the inspection control signal and the pre-charge control signal.

6. An electronic apparatus, comprising:
  the electro-optical device according to claim 1.

* * * * *